US010538081B2

(12) United States Patent
Yanagi et al.

(10) Patent No.: US 10,538,081 B2
(45) Date of Patent: Jan. 21, 2020

(54) PRINTING APPARATUS, LIQUID ABSORBING APPARATUS, AND PRINTING METHOD

(71) Applicant: CANON KABUSHIKI KAISHA, Tokyo (JP)

(72) Inventors: Yuichiro Yanagi, Funabashi (JP); Masahiro Sugimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/920,479

(22) Filed: Mar. 14, 2018

(65) Prior Publication Data

US 2018/0272689 A1    Sep. 27, 2018

(30) Foreign Application Priority Data

Mar. 27, 2017   (JP) ................. 2017-061885

(51) Int. Cl.
| | | |
|---|---|---|
| B41J 2/01 | (2006.01) | |
| B41J 2/005 | (2006.01) | |
| B41J 2/175 | (2006.01) | |
| B41M 5/00 | (2006.01) | |
| B05C 1/08 | (2006.01) | |
| B01J 20/34 | (2006.01) | |
| B41M 5/025 | (2006.01) | |

(52) U.S. Cl.
CPC ............ B41J 2/0057 (2013.01); B01J 20/34 (2013.01); B05C 1/0813 (2013.01); B05C 1/0886 (2013.01); B41J 2/17566 (2013.01); B41M 5/0023 (2013.01); *B41J 2002/012* (2013.01); *B41M 5/0256* (2013.01)

(58) Field of Classification Search
USPC ....................................................... 347/101
See application file for complete search history.

(56) References Cited

U.S. PATENT DOCUMENTS

| | | |
|---|---|---|
| 6,682,189 B2 | 1/2004 | May et al. |
| 6,767,092 B2 | 7/2004 | May et al. |
| 8,038,285 B2 | 10/2011 | Uemura et al. |

FOREIGN PATENT DOCUMENTS

| | | |
|---|---|---|
| JP | 2003-182064 A | 7/2003 |
| JP | 2009-090274 A | 4/2009 |

OTHER PUBLICATIONS

U.S. Appl. No. 15/910,444, Masahiro Sugimoto Yuichiro Yanagi, filed Mar. 2, 2018.
U.S. Appl. No. 15/920,838, Yuichiro Yanagi Masahiro Sugimoto, filed Mar. 14, 2018.

*Primary Examiner* — Lam S Nguyen
(74) *Attorney, Agent, or Firm* — Venable LLP

(57) ABSTRACT

A printing apparatus includes an image forming unit that forms an ink image, a transfer unit that transfers the ink image formed on a transfer member to a print medium in a transfer operation, and a liquid absorbing member that absorbs a liquid component from the ink image before the transfer operation. A recovery unit recovers absorption performance of the liquid absorbing member by applying a moisturizing liquid to the liquid absorbing member. A first estimation unit estimates, based on print data, an ink discharge amount of ink to form the ink image, and a second estimation unit estimates a liquid amount of the liquid component to be absorbed by the liquid absorbing member from the estimated ink discharge amount. In addition, a control unit controls an application amount of the moisturizing liquid by the recovery unit based on a result of estimation by the second estimation unit.

18 Claims, 15 Drawing Sheets

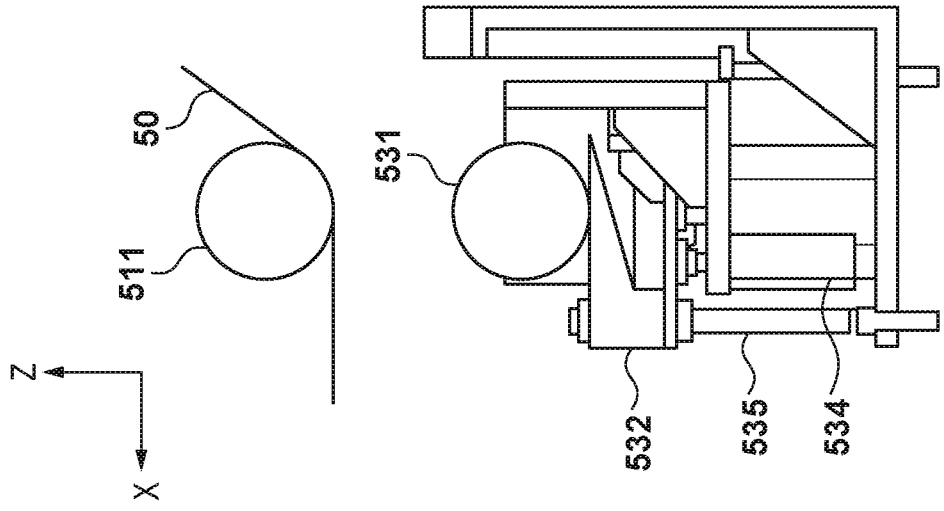
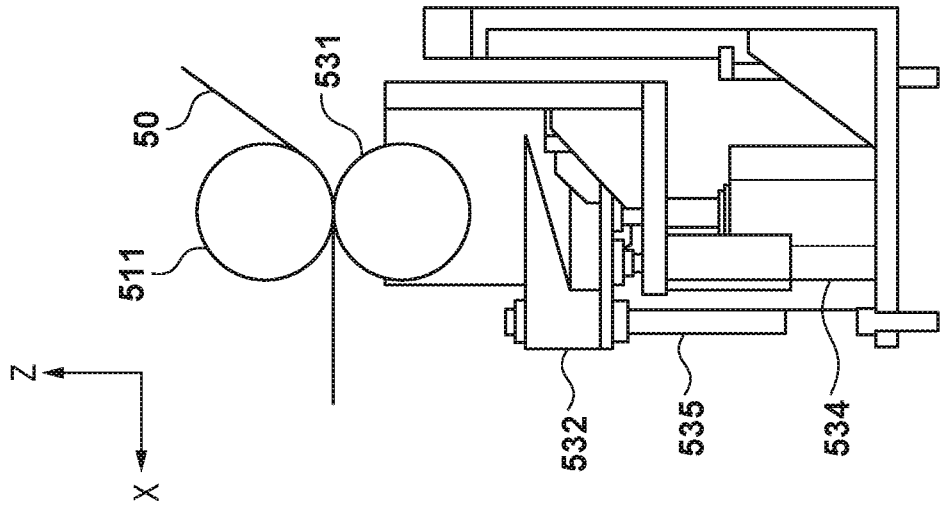
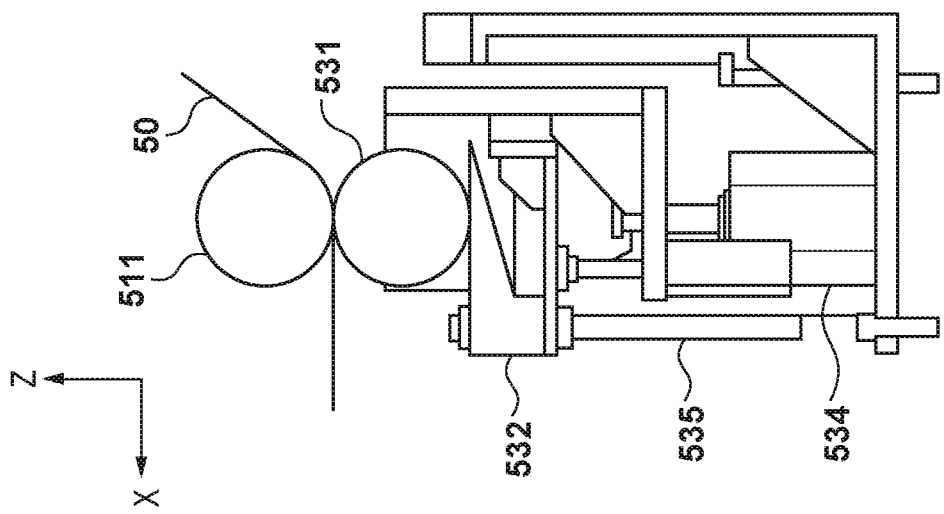

F I G. 13A
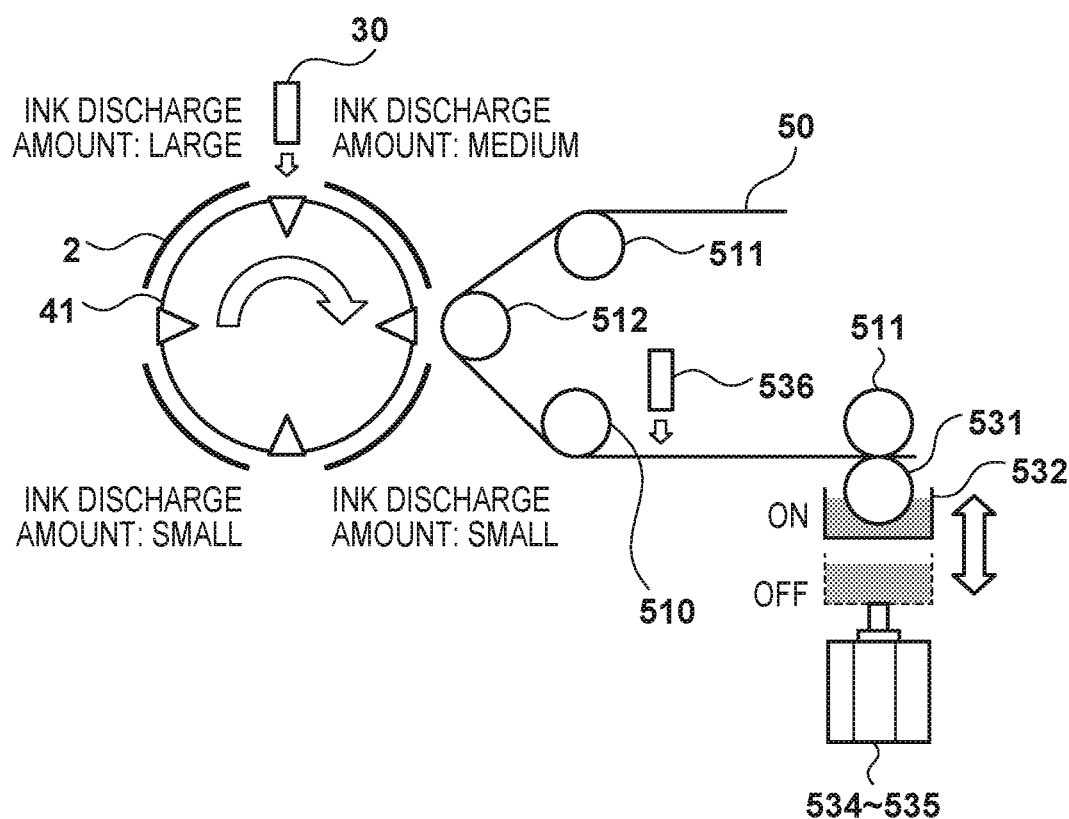

PRINTING APPARATUS, LIQUID ABSORBING APPARATUS, AND PRINTING METHOD

BACKGROUND OF THE INVENTION

Field of the Invention

The present invention relates to a printing apparatus, a liquid absorbing apparatus, and a printing method, and particularly to, for example, a technique of absorbing a liquid component of ink discharged to a transfer member in a printing apparatus that transfers an image formed by discharging the ink to the transfer member to a print medium and prints the image.

Description of the Related Art

A technique of forming an ink image on a transfer member and transferring it to a print medium such as paper is proposed. For example, Japanese Patent Laid-Open No. 2003-182064 discloses an image formation apparatus configured to form an ink image on an intermediate member and transfer the ink image to a sheet. This apparatus includes an inkjet device that forms a primary image on the intermediate member. This apparatus also includes a zone where a coagulation body is formed in the primary image, a zone where a liquid is partially removed from the coagulation body, a zone where an image is transferred to a sheet, and a zone where the surface of the intermediate member (intermediate transfer member) is restored before a new primary image is formed.

Japanese Patent Laid-Open No. 2009-90274 discloses an arrangement that intermittently applies, in advance, a processed liquid for coagulating ink to an intermediate transfer member before an image is formed by discharging the ink onto the intermediate transfer member. This is implemented by moving up and down vertically a roller that absorbs a processed liquid in a liquid receiver pan to bring the roller into contact with or separate the roller from the intermediate transfer member.

In the prior art, however, an arrangement that applies the processed liquid without grasping the condition of the intermediate transfer member but applies the processed liquid intermittently at a predetermined interval is adopted. Consequently, the processed liquid may be applied excessively and used wastefully.

It is necessary, before the image formed by discharging the ink to the intermediate transfer member is transferred to the print medium, to remove an extra liquid component from the formed image by using a liquid absorbing member and keep the condition of the formed image satisfactorily. It is therefore necessary to maintain liquid absorption performance of the liquid absorbing member satisfactorily. However, there is no arrangement that detects and keeps the condition of the liquid absorbing member.

SUMMARY OF THE INVENTION

Accordingly, the present invention is conceived as a response to the above-described disadvantages of the conventional art.

For example, a printing apparatus, a liquid absorbing apparatus, and a printing method according to this invention are capable of satisfactorily keeping liquid absorption performance of a liquid absorbing member that absorbs a liquid component of a formed ink image, and implementing higher-quality image formation and image printing.

According to one aspect of the present invention, there is provided a printing apparatus comprising: an image forming unit configured to form an ink image by discharging ink from a printhead to a transfer member; a transfer unit configured to perform a transfer operation of transferring the ink image formed on the transfer member to a print medium; a liquid absorbing member configured to be cyclically movable and to absorb a liquid component from the ink image before the transfer operation; a recovery unit arranged on a moving path of the liquid absorbing member and configured to recover absorption performance of the liquid absorbing member by applying a moisturizing liquid to the liquid absorbing member; an estimation unit configured to estimate a condition on a surface of the liquid absorbing member; and a control unit configured to control an application amount of the moisturizing liquid by the recovery unit based on a result of estimation by the estimation unit.

According to another aspect of the present invention, there is provided a liquid absorbing apparatus comprising: a liquid absorbing member configured to be cyclically movable and to absorb a liquid component from an ink image formed by discharging ink from a printhead to a transfer member before the ink image is transferred to a print medium; a recovery unit arranged on a moving path of the liquid absorbing member and configured to recover absorption performance of the liquid absorbing member by applying a moisturizing liquid to the liquid absorbing member; an estimation unit configured to estimate a condition on a surface of the liquid absorbing member; and a control unit configured to control an application amount of the moisturizing liquid by the recovery unit based on a result of estimation by the estimation unit.

According to still another aspect of the present invention, there is provided a printing method of a printing apparatus that forms an ink image by discharging ink from a printhead to a transfer member, transfers the formed ink image to a print medium, and prints the image, the method comprising: forming the ink image by discharging the ink from the printhead to the transfer member; absorbing a liquid component from the ink image formed on the transfer member by cyclically moving a liquid absorbing member; estimating a condition on a surface of the liquid absorbing member; recovering absorption performance of the liquid absorbing member by applying a moisturizing liquid to the liquid absorbing member with a recovery unit arranged on a moving path of the liquid absorbing member; controlling an application amount of the moisturizing liquid by the recovery unit based on a result of the estimating; and transferring the ink image from which the liquid component is absorbed to the print medium.

The invention is particularly advantageous since it is possible to maintain the liquid absorption performance of the liquid absorbing member satisfactorily. This makes it possible to satisfactorily keep the condition of an ink image formed on a transfer member, and transfer a higher-quality image to a print medium and print the image.

Further features of the present invention will become apparent from the following description of exemplary embodiments (with reference to the attached drawings).

BRIEF DESCRIPTION OF THE DRAWINGS

FIGS. 11A, 11B, 11C and 11D are, respectively, a perspective view showing an overall construction of the recovery unit which applies moisturizing liquid, and side views showing positional relationships between a driven rotating body, application roller, and reservoir;

FIGS. 13A and 13B are views showing a relationship between an ink discharge amount from a printhead and an ON/OFF of applying moisturizing liquid.

DESCRIPTION OF THE EMBODIMENTS

Exemplary embodiments of the present invention will now be described in detail in accordance with the accompanying drawings. Note that in each drawing, arrows X and Y indicate horizontal directions perpendicular to each other, and an arrow Z indicates an up/down direction.

Description of Terms

In this specification, the terms "print" and "printing" not only include the formation of significant information, such as characters and graphics, but also broadly include the formation of images, figures, patterns, and the like, on a print medium, or the processing of the medium, regardless of whether they are significant or insignificant and regardless of whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "print element (or nozzle)" generally means an ink orifice or a liquid channel communicating with the ink orifice, and an element for generating energy used to discharge ink, unless otherwise specified.

An element substrate for a printhead (head substrate) used below means not merely a base made of a silicon semiconductor, but an arrangement in which elements, wirings, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

<Printing System>

Figure 1:
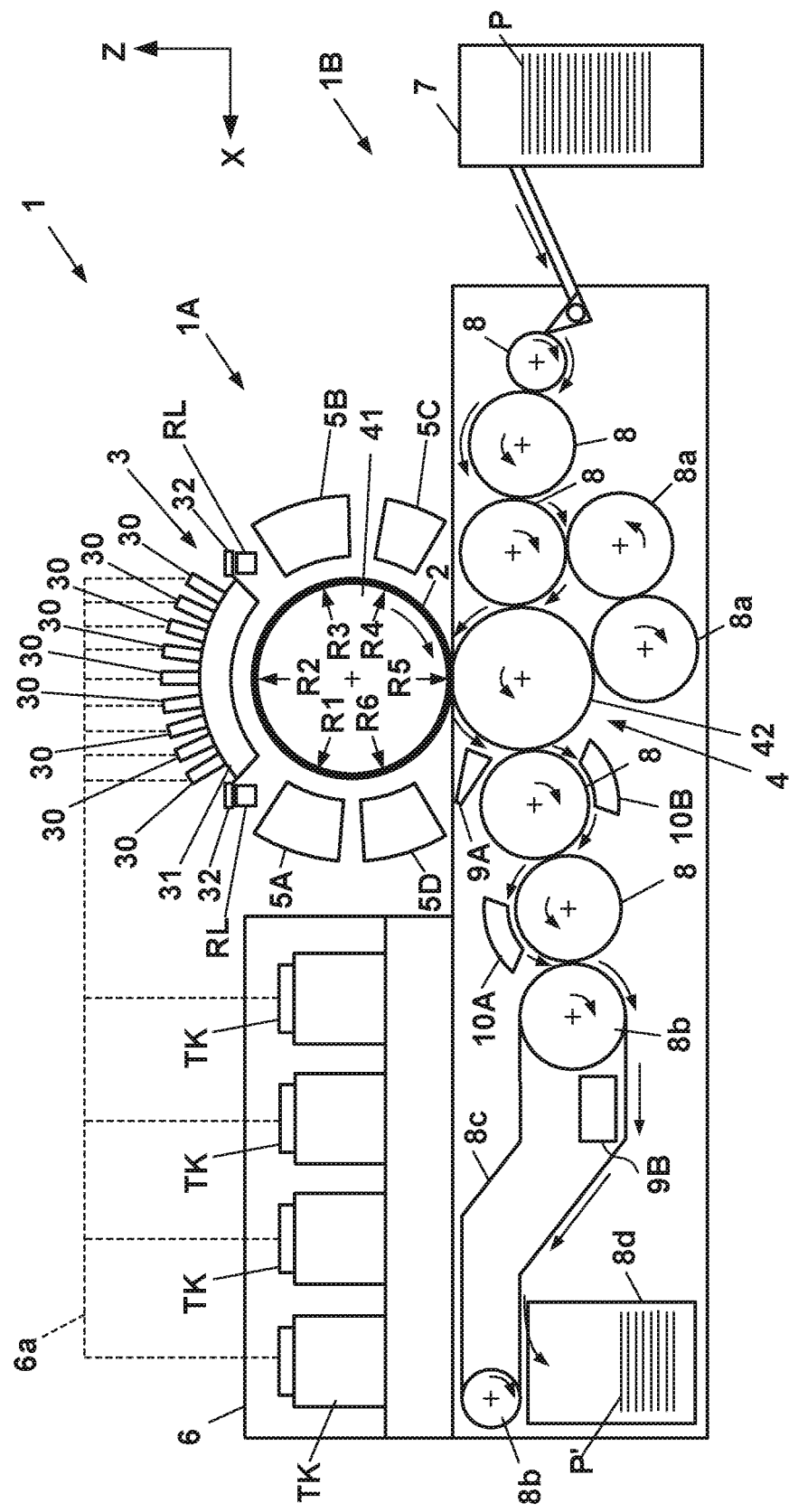
FIG. 1 is a schematic view showing a printing system according to an exemplary embodiment of the present invention.

FIG. 1 is a front view schematically showing a printing system 1 according to an embodiment of the present invention. The printing system 1 is a sheet inkjet printer that forms a printed product P' by transferring an ink image to a print medium P via a transfer member 2. The printing system 1 includes a printing apparatus 1A and a conveyance apparatus 1B. In this embodiment, an X direction, a Y direction, and a Z direction indicate the widthwise direction (total length direction), the depth direction, and the height direction of the printing system 1, respectively. The print medium P is conveyed in the X direction.

This invention is not limited to any specific ink component, however, it is assumed that this embodiment uses water-based pigment ink including water, resin, and pigment serving as coloring material.

<Printing Apparatus>

The printing apparatus 1A includes a print unit 3, a transfer unit 4, peripheral units 5A to 5D, and a supply unit 6.

<Print Unit>

Figure 2:
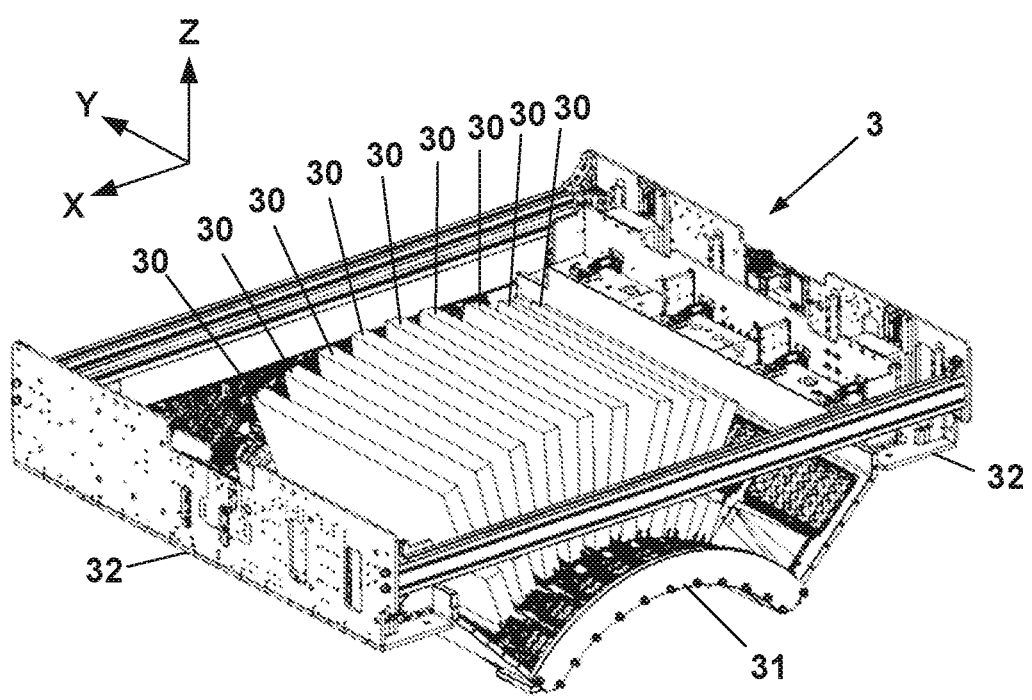
FIG. 2 is a perspective view showing a print unit.

The print unit 3 includes a plurality of printheads 30 and a carriage 31. A description will be made with reference to FIGS. 1 and 2. FIG. 2 is perspective view showing the print unit 3. The printheads 30 discharge liquid ink to the transfer member (intermediate transfer member) 2 and form ink images of a printed image on the transfer member 2.

In this embodiment, each printhead 30 is a full-line head elongated in the Y direction, and nozzles are arrayed in a range where they cover the width of an image printing area of a print medium having a usable maximum size. Each printhead 30 has an ink discharge surface with the opened nozzle on its lower surface, and the ink discharge surface faces the surface of the transfer member 2 via a minute gap (for example, several mm). In this embodiment, the transfer member 2 is configured to move on a circular orbit cyclically, and thus the plurality of printheads 30 are arranged radially.

Each nozzle includes a discharge element. The discharge element is, for example, an element that generates a pressure in the nozzle and discharges ink in the nozzle, and the technique of an inkjet head in a well-known inkjet printer is applicable. For example, an element that discharges ink by causing film boiling in ink with an electrothermal transducer and forming a bubble, an element that discharges ink by an electromechanical transducer (piezoelectric element), an element that discharges ink by using static electricity, or the like can be given as the discharge element. A discharge element that uses the electrothermal transducer can be used from the viewpoint of high-speed and high-density printing.

In this embodiment, nine printheads 30 are provided. The respective printheads 30 discharge different kinds of inks. The different kinds of inks are, for example, different in coloring material and include yellow ink, magenta ink, cyan ink, black ink, and the like. One printhead 30 discharges one kind of ink. However, one printhead 30 may be configured to discharge the plurality of kinds of inks. When the plurality of printheads 30 are thus provided, some of them may discharge ink (for example, clear ink) that does not include a coloring material.

The carriage 31 supports the plurality of printheads 30. The end of each printhead 30 on the side of an ink discharge surface is fixed to the carriage 31. This makes it possible to maintain a gap on the surface between the ink discharge surface and the transfer member 2 more precisely. The carriage 31 is configured to be displaceable while mounting the printheads 30 by the guide of each guide member RL. In this embodiment, the guide members RL are rail members elongated in the Y direction and provided as a pair separately in the X direction. A slide portion 32 is provided on each side of the carriage 31 in the X direction. The slide portions 32 engage with the guide members RL and slide along the guide members RL in the Y direction.

Figure 3:
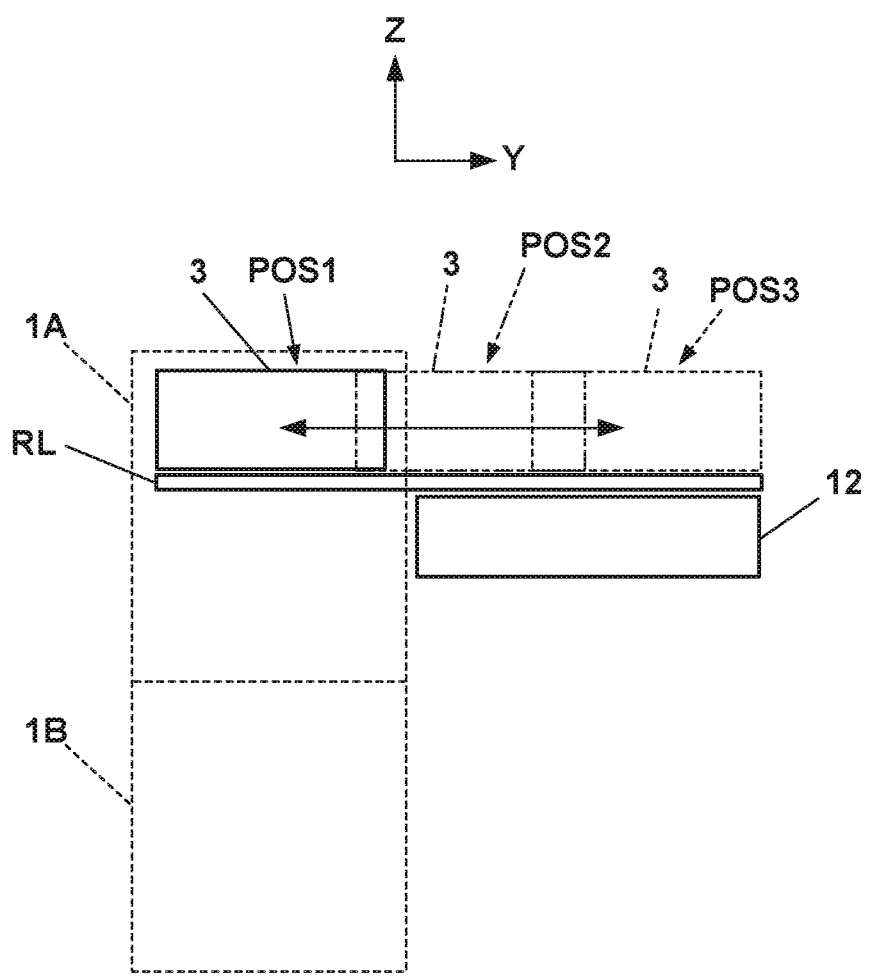
FIG. 3 is an explanatory view showing a displacement mode of the print unit in FIG. 2.

FIG. 3 is a view showing a displacement mode of the print unit 3 and schematically shows the right side surface of the printing system 1. A recovery unit 12 is provided in the rear of the printing system 1. The recovery unit 12 has a mechanism for recovering discharge performance of the printheads 30. For example, a cap mechanism which caps the ink discharge surface of each printhead 30, a wiper mechanism which wipes the ink discharge surface, a suction mechanism which sucks ink in the printhead 30 by a negative pressure from the ink discharge surface can be given as such mechanisms.

The guide member RL is elongated over the recovery unit 12 from the side of the transfer member 2. By the guide of the guide member RL, the print unit 3 is displaceable between a discharge position POS1 at which the print unit 3 is indicated by a solid line and a recovery position POS3 at which the print unit 3 is indicated by a broken line, and is moved by a driving mechanism (not shown).

The discharge position POS1 is a position at which the print unit 3 discharges ink to the transfer member 2 and a position at which the ink discharge surface of each printhead 30 faces the surface of the transfer member 2. The recovery position POS3 is a position retracted from the discharge position POS1 and a position at which the print unit 3 is positioned above the recovery unit 12. The recovery unit 12 can perform recovery processing on the printheads 30 when the print unit 3 is positioned at the recovery position POS3. In this embodiment, the recovery unit 12 can also perform the recovery processing in the middle of movement before the print unit 3 reaches the recovery position POS3. There is a preliminary recovery position POS2 between the discharge position POS1 and the recovery position POS3. The recovery unit 12 can perform preliminary recovery processing on the printheads 30 at the preliminary recovery position POS2 while the printheads 30 move from the discharge position POS1 to the recovery position POS3.

<Transfer Unit>

The transfer unit 4 will be described with reference to FIG. 1. The transfer unit 4 includes a transfer drum 41 and a pressurizing drum 42. Each of these drums is a rotating body that rotates about a rotation axis in the Y direction and has a columnar outer peripheral surface. In FIG. 1, arrows shown in respective views of the transfer drum 41 and the pressurizing drum 42 indicate their rotation directions. The transfer drum 41 rotates clockwise, and the pressurizing drum 42 rotates counter-clockwise.

The transfer drum 41 is a support member that supports the transfer member 2 on its outer peripheral surface. The transfer member 2 is provided on the outer peripheral surface of the transfer drum 41 continuously or intermittently in a circumferential direction. If the transfer member 2 is provided continuously, it is formed into an endless swath. If the transfer member 2 is provided intermittently, it is formed into swaths with ends divided into a plurality of segments. The respective segments can be arranged in an arc at an equal pitch on the outer peripheral surface of the transfer drum 41.

The transfer member 2 moves cyclically on the circular orbit by rotating the transfer drum 41. By the rotational phase of the transfer drum 41, the position of the transfer member 2 can be discriminated into a processing area R1 before discharge, a discharge area R2, processing areas R3 and R4 after discharge, a transfer area R5, and a processing area R6 after transfer. The transfer member 2 passes through these areas cyclically.

The processing area R1 before discharge is an area where preprocessing is performed on the transfer member 2 before the print unit 3 discharges ink and an area where the peripheral unit 5A performs processing. In this embodiment, a reactive liquid is applied. The discharge area R2 is a formation area where the print unit 3 forms an ink image by discharging ink to the transfer member 2. The processing areas R3 and R4 after discharge are processing areas where processing is performed on the ink image after ink discharge. The processing area R3 after discharge is an area where the peripheral unit 5B performs processing, and the processing area R4 after discharge is an area where the peripheral unit 5C performs processing. The transfer area R5 is an area where the transfer unit 4 transfers the ink image on the transfer member 2 to the print medium P. The processing area R6 after transfer is an area where post processing is performed on the transfer member 2 after transfer and an area where the peripheral unit 5D performs processing.

In this embodiment, the discharge area R2 is an area with a predetermined section. The other areas R1 and R3 to R6 have narrower sections than the discharge area R2. Comparing to the face of a clock, in this embodiment, the processing area R1 before discharge is positioned at almost 10 o'clock, the discharge area R2 is in a range from almost 11 o'clock to 1 o'clock, the processing area R3 after discharge is positioned at almost 2 o'clock, and the processing area R4 after discharge is positioned at almost 4 o'clock. The transfer area R5 is positioned at almost 6 o'clock, and the processing area R6 after transfer is an area at almost 8 o'clock.

The transfer member 2 may be formed by a single layer but may be an accumulative body of a plurality of layers. If the transfer member 2 is formed by the plurality of layers, it may include three layers of, for example, a surface layer, an elastic layer, and a compressed layer. The surface layer is an outermost layer having an image formation surface where the ink image is formed. By providing the compressed layer, the compressed layer absorbs deformation and disperses a local pressure fluctuation, making it possible to maintain transferability even at the time of high-speed printing. The elastic layer is a layer between the surface layer and the compressed layer.

As a material for the surface layer, various materials, such as a resin and a ceramic, can be used appropriately. With respect to durability, or the like, however, a material high in compressive modulus can be used. More specifically, an acrylic resin, an acrylic silicone resin, a fluoride-containing resin, a condensate obtained by condensing a hydrolyzable organosilicon compound, and the like, can be used. The surface layer that has undergone a surface treatment may be used in order to improve wettability of the reactive liquid, the transferability of an image, or the like. Frame processing, a corona treatment, a plasma treatment, a polishing treatment, a roughing treatment, an active energy beam irradiation treatment, an ozone treatment, a surfactant treatment, a silane coupling treatment, or the like, can be used as the surface treatment. A plurality of these treatments may be combined. It is also possible to provide any desired surface shape in the surface layer.

For example, acrylonitrile-butadiene rubber, acrylic rubber, chloroprene rubber, urethane rubber, silicone rubber, or the like can be given as a material for the compressed layer. When such a rubber material is formed, a porous rubber material may be formed by blending a predetermined amount of a vulcanizing agent, vulcanizing accelerator, or the like and further blending a foaming agent, or a filling agent such as hollow fine particles or salt as needed. Consequently, a bubble portion is compressed along with a volume change with respect to various pressure fluctuations, and thus deformation in directions other than a compression direction is small, making it possible to obtain more stable transferability and durability. As the porous rubber material, there are a material having an open cell structure in which respective pores continue to each other and a material having a closed cell structure in which the respective pores are independent of each other. However, either structure may be used, or both of these structures may be used.

As a member for the elastic layer, the various materials such as the resin and the ceramic can be used appropriately. In respect of processing characteristics, various materials of an elastomer material and a rubber material can be used. More specifically, for example, fluorosilicone rubber, phenyl silicone rubber, fluorine rubber, chloroprene rubber, urethane rubber, nitrile rubber, and the like can be given. In addition, ethylene propylene rubber, natural rubber, styrene rubber, isoprene rubber, butadiene rubber, the copolymer of ethylene/propylene/butadiene, nitrile-butadiene rubber, and the like can be given. In particular, silicone rubber, fluorosilicone rubber, and phenyl silicon rubber are advantageous in terms of dimensional stability and durability because of their small compression set. They are also advantageous in terms of transferability because of their small elasticity change by a temperature.

Between the surface layer and the elastic layer and between the elastic layer and the compressed layer, various adhesives or double-sided adhesive tapes can also be used in order to fix them to each other. The transfer member 2 may also include a reinforce layer high in compressive modulus in order to suppress elongation in a horizontal direction or maintain resilience when attached to the transfer drum 41. Woven fabric may be used as a reinforce layer. The transfer member 2 can be manufactured by combining the respective layers formed by the materials described above in any desired manner.

The outer peripheral surface of the pressurizing drum 42 is pressed against the transfer member 2. At least one grip mechanism which grips the leading edge portion of the print medium P is provided on the outer peripheral surface of the pressurizing drum 42. A plurality of grip mechanisms may be provided separately in the circumferential direction of the pressurizing drum 42. The ink image on the transfer member 2 is transferred to the print medium P when it passes through a nip portion between the pressurizing drum 42 and the transfer member 2 while being conveyed in tight contact with the outer peripheral surface of the pressurizing drum 42.

The transfer drum 41 and the pressurizing drum 42 share a driving source such as a motor that drives them. A driving force can be delivered by a transmission mechanism such as a gear mechanism.

<Peripheral Unit>

The peripheral units 5A to 5D are arranged around the transfer drum 41. In this embodiment, the peripheral units 5A to 5D are specifically an application unit, an absorption unit, a heating unit, and a cleaning unit in order.

The application unit 5A is a mechanism which applies the reactive liquid onto the transfer member 2 before the print unit 3 discharges ink. The reactive liquid is a liquid that contains a component increasing an ink viscosity. An increase in ink viscosity here means that a coloring material, a resin, and the like that form the ink react chemically or suck physically by contacting the component that increases the ink viscosity, recognizing the increase in ink viscosity. This increase in ink viscosity includes not only a case in which an increase in viscosity of entire ink is recognized but also a case in which a local increase in viscosity is generated by coagulating some of components such as the coloring material and the resin that form the ink.

The component that increases the ink viscosity can use, without particular limitation, a substance such as metal ions or a polymeric coagulant that causes a pH change in ink and coagulates the coloring material in the ink, and can use an organic acid. For example, a roller, a printhead, a die coating apparatus (die coater), a blade coating apparatus (blade coater), or the like can be given as a mechanism which applies the reactive liquid. If the reactive liquid is applied to the transfer member 2 before the ink is discharged to the transfer member 2, it is possible to immediately fix ink that reaches the transfer member 2. This makes it possible to suppress bleeding caused by mixing adjacent inks.

The absorption unit 5B is a mechanism which absorbs a liquid component from the ink image on the transfer member 2 before transfer. It is possible to suppress, for example, a blur of an image printed on the print medium P by decreasing the liquid component of the ink image. Describing a decrease in liquid component from another point of view, it is also possible to represent it as concentrating ink that forms the ink image on the transfer member 2. Concentrating the ink means increasing the content of a solid content such as a coloring material or a resin included in the ink with respect to the liquid component by decreasing the liquid component included in the ink.

The absorption unit 5B includes, for example, a liquid absorbing member that decreases the amount of the liquid component of the ink image by contacting the ink image. The liquid absorbing member may be formed on the outer peripheral surface of the roller or may be formed into an endless sheet-like shape and run cyclically. In terms of protection of the ink image, the liquid absorbing member may be moved in synchronism with the transfer member 2 by making the moving speed of the liquid absorbing member equal to the peripheral speed of the transfer member 2.

The liquid absorbing member may include a porous body that contacts the ink image. The pore size of the porous body on the surface that contacts the ink image may be equal to or smaller than 10 μm in order to suppress adherence of an ink solid content to the liquid absorbing member. The pore size here refers to an average diameter and can be measured by a known means such as a mercury intrusion technique, a nitrogen adsorption method, an SEM image observation, or the like. Note that the liquid component does not have a fixed shape, and is not particularly limited if it has fluidity and an almost constant volume. For example, water, an organic solvent, or the like contained in the ink or reactive liquid can be given as the liquid component.

The heating unit 5C is a mechanism which heats the ink image on the transfer member 2 before transfer. A resin in the ink image melts by heating the ink image, improving transferability to the print medium P. A heating temperature can be equal to or higher than the minimum film forming temperature (MFT) of the resin. The MFT can be measured by each apparatus that complies with a generally known method such as JIS K 6828-2: 2003 or ISO 2115: 1996. From the viewpoint of transferability and image robustness, the ink image may be heated at a temperature higher than the MFT by 10° C. or higher, or may further be heated at a temperature higher than the MFT by 20° C. or higher. The heating unit 5C can use a known heating device, for example, various lamps such as infrared rays, a warm air fan, or the like. An infrared heater can be used in terms of heating efficiency.

The cleaning unit 5D is a mechanism which cleans the transfer member 2 after transfer. The cleaning unit 5D removes ink remaining on the transfer member 2, dust on the transfer member 2, or the like. The cleaning unit 5D can use a known method, for example, a method of bringing a porous member into contact with the transfer member 2, a method of scraping the surface of the transfer member 2 with a brush, a method of scratching the surface of the transfer member 2 with a blade, or the like as needed. A known shape such as a roller shape or a web shape can be used for a cleaning member used for cleaning.

As described above, in this embodiment, the application unit 5A, the absorption unit 5B, the heating unit 5C, and the cleaning unit 5D are included as the peripheral units. However, cooling functions of the transfer member 2 may be applied, or cooling units may be added to these units. In this embodiment, the temperature of the transfer member 2 may be increased by heat of the heating unit 5C. If the ink image exceeds the boiling point of water as a prime solvent of ink after the print unit 3 discharges ink to the transfer member 2, performance of liquid component absorption by the absorption unit 5B may be degraded. It is possible to maintain the performance of liquid component absorption by cooling the transfer member 2 such that the temperature of the discharged ink is maintained below the boiling point of water.

The cooling unit may be an air blowing mechanism which blows air to the transfer member 2, or a mechanism which brings a member (for example, a roller) into contact with the transfer member 2 and cools this member by air-cooling or water-cooling. The cooling unit may be a mechanism which cools the cleaning member of the cleaning unit 5D. A cooling timing may be a period before application of the reactive liquid after transfer.

<Supply Unit>

The supply unit 6 is a mechanism which supplies ink to each printhead 30 of the print unit 3. The supply unit 6 may be provided on the rear side of the printing system 1. The supply unit 6 includes a reservoir TK that reserves ink for each kind of ink. Each reservoir TK may be made of a main tank and a sub tank. Each reservoir TK and a corresponding one of the printheads 30 communicate with each other by a liquid passageway 6a, and ink is supplied from the reservoir TK to the printhead 30. The liquid passageway 6a may circulate ink between the reservoirs TK and the printheads 30. The supply unit 6 may include, for example, a pump that circulates ink. A deaerating mechanism which deaerates bubbles in ink may be provided in the middle of the liquid passageway 6a or in each reservoir TK. A valve that adjusts the fluid pressure of ink and an atmospheric pressure may be provided in the middle of the liquid passageway 6a or in each reservoir TK. The heights of each reservoir TK and each printhead 30 in the Z direction may be designed such that the liquid surface of ink in the reservoir TK is positioned lower than the ink discharge surface of the printhead 30.

<Conveyance Apparatus>

The conveyance apparatus 1B is an apparatus that feeds the print medium P to the transfer unit 4 and discharges, from the transfer unit 4, the printed product P' to which the ink image was transferred. The conveyance apparatus 1B includes a feeding unit 7, a plurality of conveyance drums 8 and 8a, two sprockets 8b, a chain 8c, and a collection unit 8d. In FIG. 1, an arrow inside a view of each constituent element in the conveyance apparatus 1B indicates a rotation direction of the constituent element, and an arrow outside the view of each constituent element indicates a conveyance path of the print medium P or the printed product P'. The print medium P is conveyed from the feeding unit 7 to the transfer unit 4, and the printed product P' is conveyed from the transfer unit 4 to the collection unit 8d. The side of the feeding unit 7 may be referred to as an upstream side in a conveyance direction, and the side of the collection unit 8d may be referred to as a downstream side.

The feeding unit 7 includes a stacking unit where the plurality of print media P are stacked and a feeding mechanism which feeds the print media P one by one from the stacking unit to the most upstream conveyance drum 8. Each of the conveyance drums 8 and 8a is a rotating body that rotates about the rotation axis in the Y direction and has a columnar outer peripheral surface. At least one grip mechanism which grips the leading edge portion of the print medium P (printed product P') is provided on the outer peripheral surface of each of the conveyance drums 8 and 8a. A gripping operation and release operation of each grip mechanism may be controlled such that the print medium P is transferred between the adjacent conveyance drums.

The two conveyance drums 8a are used to reverse the print medium P. When the print medium P undergoes double-side printing, it is not transferred to the conveyance drum 8 adjacent on the downstream side, but is transferred to the conveyance drums 8a from the pressurizing drum 42 after transfer of the ink image onto the surface of the print medium P. The print medium P is reversed via the two conveyance drums 8a and is transferred to the pressurizing drum 42 again via the conveyance drums 8a on the upstream side of the pressurizing drum 42. Consequently, the reverse surface of the print medium P faces the transfer drum 41, for transfer of the ink image to the reverse surface.

The chain 8c is wound between the two sprockets 8b. One of the two sprockets 8b is a driving sprocket, and the other is a driven sprocket. The chain 8c runs cyclically by rotating the driving sprocket. The chain 8c includes a plurality of grip mechanisms spaced apart from each other in its longitudinal direction. Each grip mechanism grips the end of the printed product P'. The printed product P' is transferred from the conveyance drum 8 positioned at a downstream end to each grip mechanism of the chain 8c, and the printed product P' gripped by the grip mechanism is conveyed to the collection unit 8d by running the chain 8c, releasing gripping. Consequently, the printed product P' is stacked in the collection unit 8d.

<Post Processing Unit>

The conveyance apparatus 1B includes post processing units 10A and 10B. The post processing units 10A and 10B are mechanisms which are arranged on the downstream side of the transfer unit 4, and perform post processing on the printed product P'. The post processing unit 10A performs processing on the obverse surface of the printed product P', and the post processing unit 10B performs processing on the reverse surface of the printed product P'. The contents of the post processing includes, for example, coating that aims at protection, improving glossiness, and the like of an image on the image printed surface of the printed product P'. For example, liquid application, sheet welding, lamination, and the like, can be used as an example of coating.

<Inspection Unit>

The conveyance apparatus 1B includes inspection units 9A and 9B. The inspection units 9A and 9B are mechanisms which are arranged on the downstream side of the transfer unit 4, and inspect the printed product P'.

In this embodiment, the inspection unit 9A is an image capturing apparatus that captures an image printed on the printed product P' and includes an image sensor, for example, a CCD sensor, a CMOS sensor, or the like. The inspection unit 9A captures a printed image while a printing operation is performed continuously. Based on the image captured by the inspection unit 9A, it is possible to confirm a temporal change in tint or the like of the printed image and determine whether to correct image data or print data. In this embodiment, the inspection unit 9A has an imaging range set on the outer peripheral surface of the pressurizing drum 42 and is arranged to be able to partially capture the printed image immediately after transfer. The inspection unit 9A may inspect all printed images or may inspect the images every predetermined sheets.

In this embodiment, the inspection unit 9B is also an image capturing apparatus that captures an image printed on the printed product P' and includes an image sensor, for example, a CCD sensor, a CMOS sensor, or the like. The inspection unit 9B captures a printed image in a test printing operation. The inspection unit 9B can capture the entire printed image. Based on the image captured by the inspection unit 9B, it is possible to perform basic settings for various correction operations regarding print data. In this embodiment, the inspection unit 9B is arranged at a position to capture the printed product P' conveyed by the chain 8c. When the inspection unit 9B captures the printed image, it captures the entire image by temporarily suspending the run of the chain 8c. The inspection unit 9B may be a scanner that scans the printed product P'.

<Control Unit>

Figure 4:
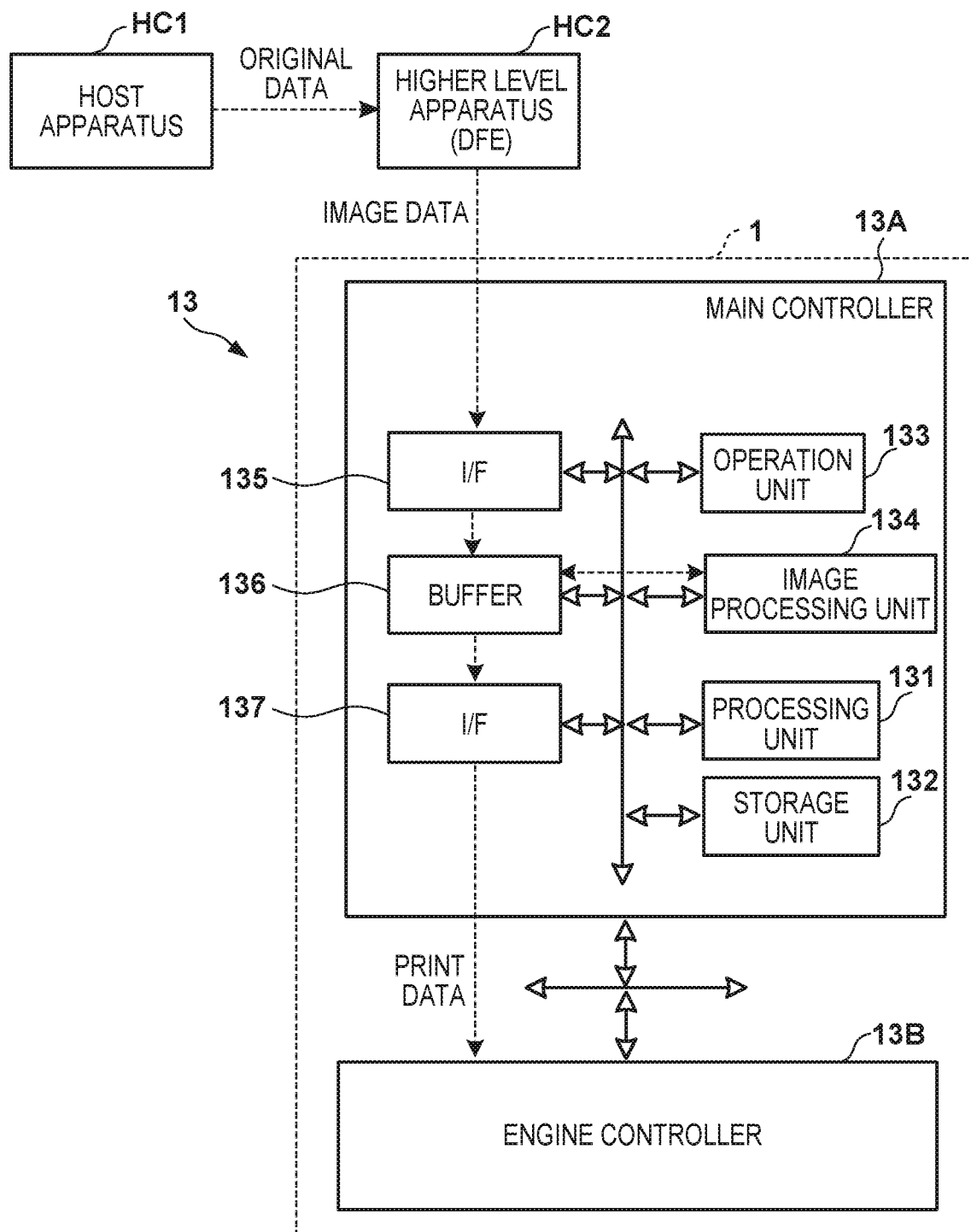
FIG. 4 is a block diagram showing a control system of the printing system in FIG. 1.
Figure 5:
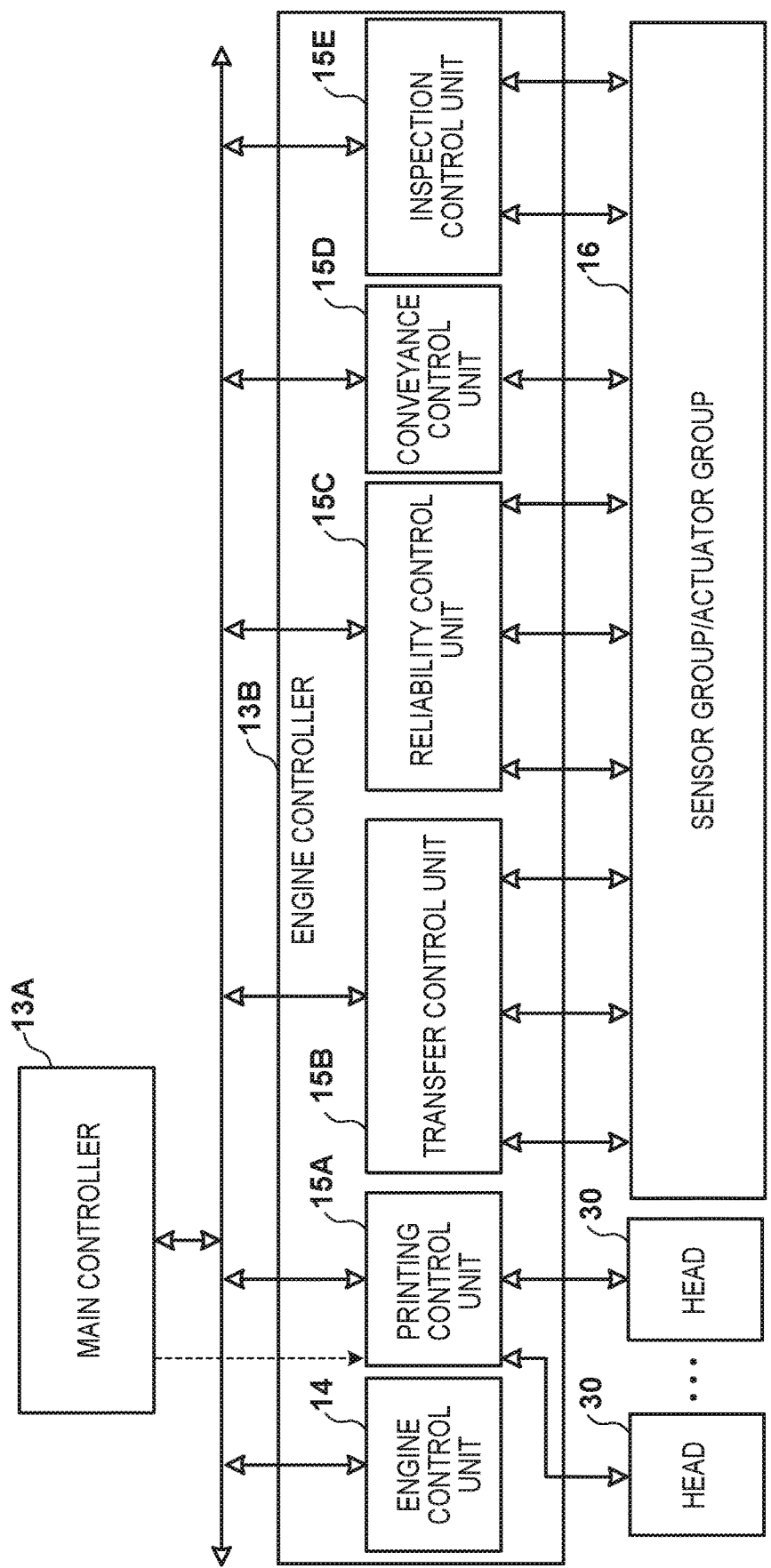
FIG. 5 is a block diagram showing the control system of the printing system in FIG. 1.

A control unit of the printing system 1 will be described next. FIGS. 4 and 5 are block diagrams each showing a control unit 13 of the printing system 1. The control unit 13 is communicably connected to a higher level apparatus (DFE) HC2, and the higher level apparatus HC2 is communicably connected to a host apparatus HC1.

The host apparatus HC1 may be, for example, a PC (Personal Computer) serving as an information processing apparatus, or a server apparatus. A communication method between the host apparatus HC1 and the higher level apparatus HC2 may be, without particular limitation, either wired or wireless communication.

Original data to be the source of a printed image is generated or saved in the host apparatus HC1. The original data here is generated in the format of, for example, an electronic file such as a document file or an image file. This original data is transmitted to the higher level apparatus HC2. In the higher level apparatus HC2, the received original data is converted into a data format (for example, RGB data that represents an image by RGB) available by the control unit 13. The converted data is transmitted from the higher level apparatus HC2 to the control unit 13 as image data. The control unit 13 starts a printing operation based on the received image data.

In this embodiment, the control unit 13 is roughly divided into a main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 is a processor such as a CPU, executes programs stored in the storage unit 132, and controls the entire main controller 13A. The storage unit 132 is a storage device such as a RAM, a ROM, a hard disk, or an SSD, stores data and the programs executed by the processing unit (CPU) 131, and provides the processing unit (CPU) 131 with a work area. An external storage unit may further be provided in addition to the storage unit 132. The operation unit 133 is, for example, an input device such as a touch panel, a keyboard, or a mouse and accepts a user instruction. The operation unit 133 may be formed by an input unit and a display unit integrated with each other. Note that a user operation is not limited to an input via the operation unit 133, and an arrangement may be possible in which, for example, an instruction is accepted from the host apparatus HC1 or the higher level apparatus HC2.

The image processing unit 134 is, for example, an electronic circuit including an image processing processor. The buffer 136 is, for example, a RAM, a hard disk, or an SSD. The communication I/F 135 communicates with the higher level apparatus HC2, and the communication I/F 137 communicates with the engine controller 13B. In FIG. 4, broken-line arrows exemplify the processing sequence of image data. Image data received from the higher level apparatus HC2 via the communication I/F 135 is accumulated in the buffer 136. The image processing unit 134 reads out the image data from the buffer 136, performs predetermined image processing on the readout image data, and stores the processed data in the buffer 136 again. The image data after the image processing stored in the buffer 136 is transmitted from the communication I/F 137 to the engine controller 13B as print data used by a print engine.

As shown in FIG. 5, the engine controller 13B includes engine control units 14 and 15A to 15E, and obtains a detection result of a sensor group/actuator group 16 of the printing system 1 and controls driving of the groups. Each of these control units includes a processor, such as a CPU, a storage device, such as a RAM or a ROM, and an interface with an external device. Note that the division of the control units is merely illustrative, and a plurality of subdivided control units may perform some of control operations or conversely, the plurality of control units may be integrated with each other, and one control unit may be configured to implement their control contents.

The engine control unit 14 controls the entire engine controller 13B. The printing control unit 15A converts print data received from the main controller 13A into raster data or the like in a data format suitable for driving of the printheads 30. The printing control unit 15A controls discharge of each printhead 30.

The transfer control unit 15B controls the application unit 5A, the absorption unit 5B, the heating unit 5C, and the cleaning unit 5D.

The reliability control unit 15C controls the supply unit 6, the recovery unit 12, and a driving mechanism which moves the print unit 3 between the discharge position POS1 and the recovery position POS3.

The conveyance control unit 15D controls driving of the transfer unit 4 and controls the conveyance apparatus 1B. The inspection control unit 15E controls the inspection unit 9B and the inspection unit 9A.

Of the sensor group/actuator group 16, the sensor group includes a sensor that detects the position and speed of a movable part, a sensor that detects a temperature, an image sensor, and the like. The actuator group includes a motor, an electromagnetic solenoid, an electromagnetic valve, and the like.

Operation Example

Figure 6:
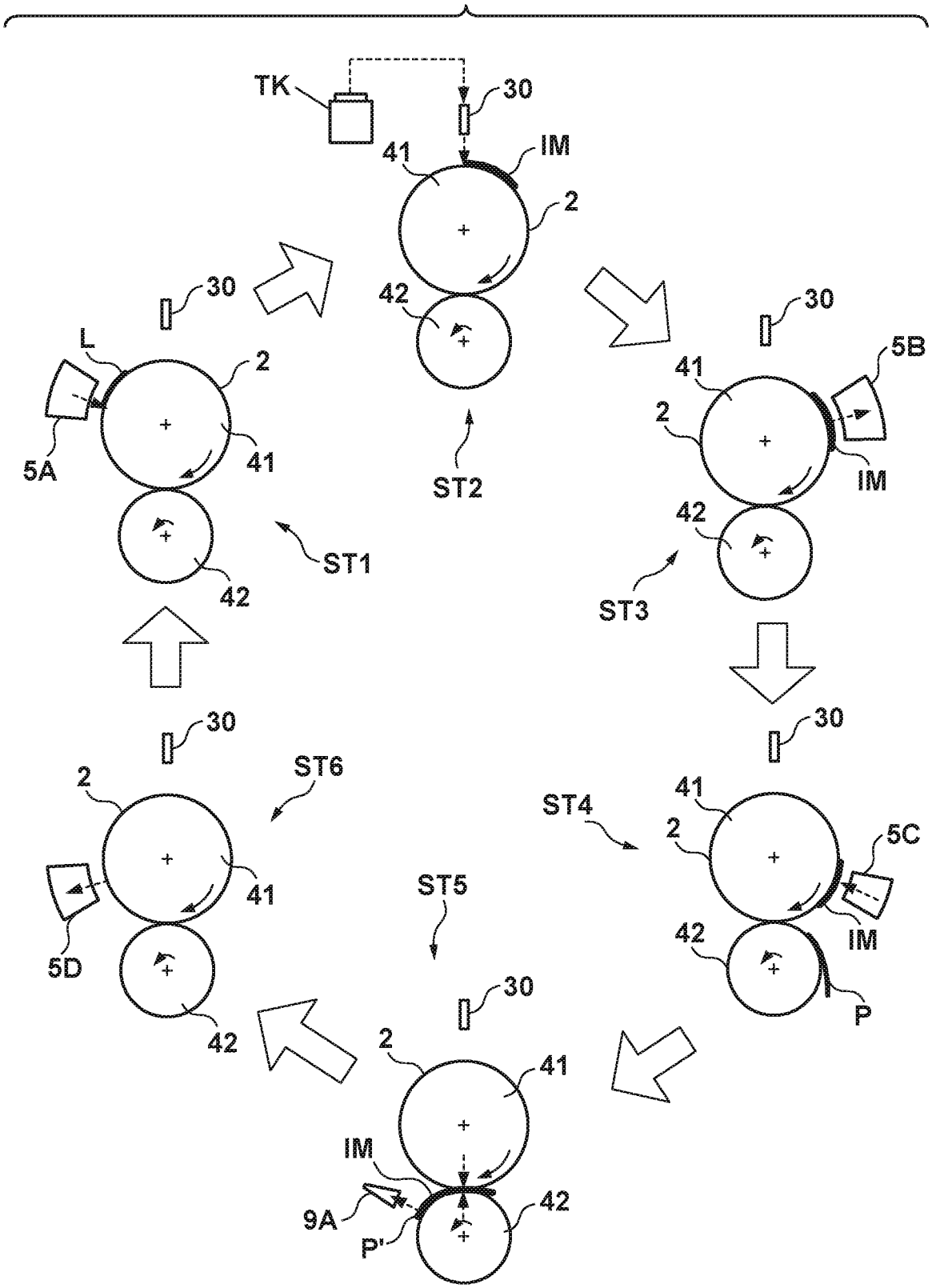
FIG. 6 is an explanatory view showing an example of the operation of the printing system in FIG. 1.

FIG. 6 is a view schematically showing an example of a printing operation. Respective steps below are performed cyclically while rotating the transfer drum 41 and the pressurizing drum 42. As shown in a state ST1, first, a reactive liquid L is applied from the application unit 5A onto the transfer member 2. A portion to which the reactive liquid L on the transfer member 2 is applied moves along with the rotation of the transfer drum 41. When the portion to which the reactive liquid L is applied reaches under the printhead 30, ink is discharged from the printhead 30 to the transfer member 2 as shown in a state ST2. Consequently, an ink image IM is formed. At this time, the discharged ink mixes with the reactive liquid L on the transfer member 2, promoting coagulation of the coloring materials. The discharged ink is supplied from the reservoir TK of the supply unit 6 to the printhead 30.

The ink image IM on the transfer member 2 moves along with the rotation of the transfer member 2. When the ink image IM reaches the absorption unit 5B, as shown in a state ST3, the absorption unit 5B absorbs a liquid component from the ink image IM. When the ink image IM reaches the heating unit 5C, as shown in a state ST4, the heating unit 5C heats the ink image IM, a resin in the ink image IM melts, and a film of the ink image IM is formed. In synchronism with such formation of the ink image IM, the conveyance apparatus 1B conveys the print medium P.

As shown in a state ST5, the ink image IM and the print medium P reach the nip portion between the transfer member 2 and the pressurizing drum 42, the ink image IM is transferred to the print medium P, and the printed product P' is formed. Passing through the nip portion, the inspection unit 9A captures an image printed on the printed product P' and inspects the printed image. The conveyance apparatus 1B conveys the printed product P' to the collection unit 8d.

When a portion where the ink image IM on the transfer member 2 is formed reaches the cleaning unit 5D, it is cleaned by the cleaning unit 5D as shown in a state ST6. After the cleaning, the transfer member 2 rotates once, and transfer of the ink image to the print medium P is performed repeatedly in the same procedure. The description above has been given such that transfer of the ink image IM to one print medium P is performed once in one rotation of the transfer member 2 for the sake of easy understanding. It is possible, however, to continuously perform transfer of the ink image IM to the plurality of print media P in one rotation of the transfer member 2.

Each printhead 30 needs maintenance if such a printing operation continues.

Figure 7:
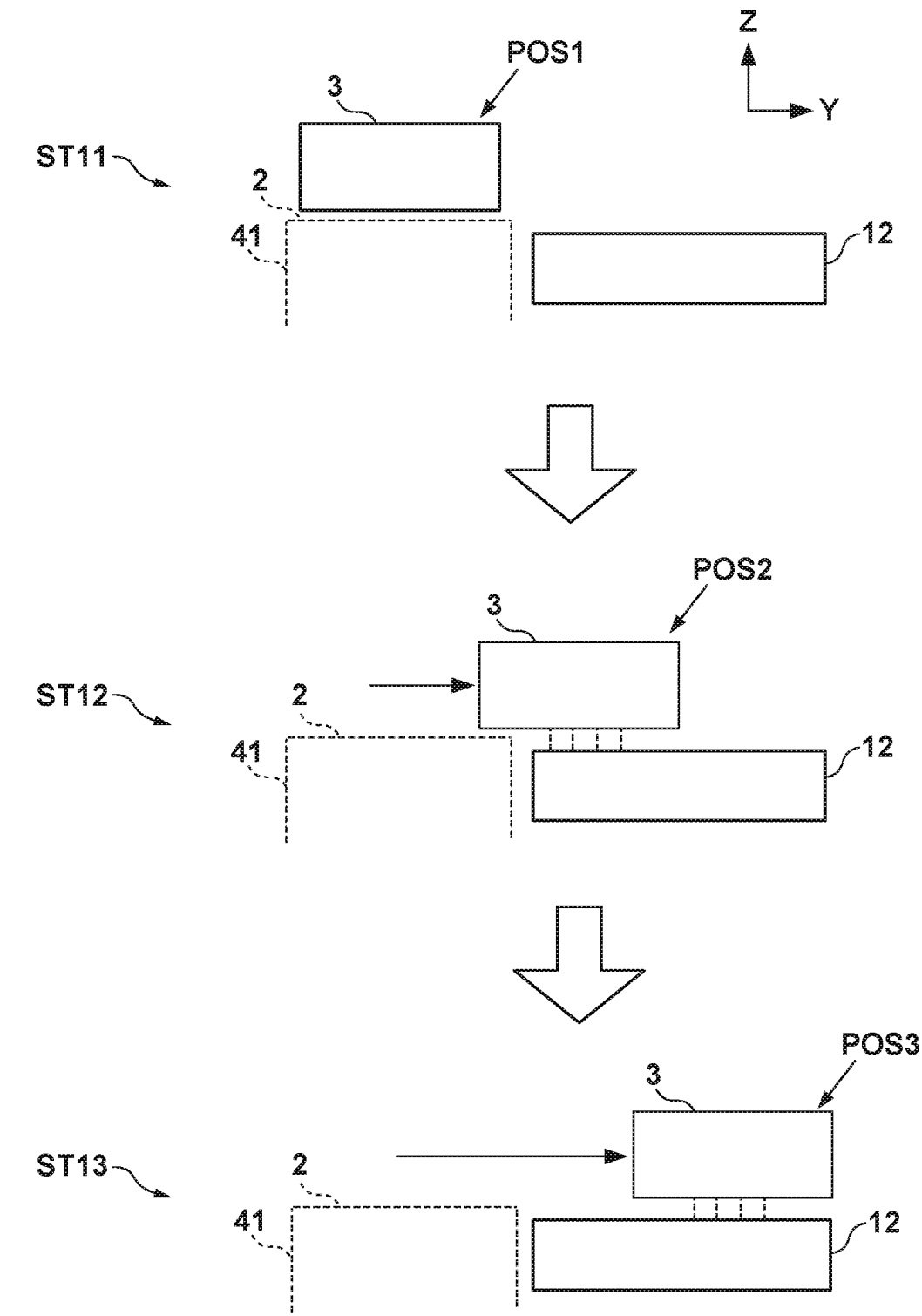
FIG. 7 is an explanatory view showing an example of the operation of the printing system in FIG. 1.

FIG. 7 shows an operation example at the time of maintenance of each printhead 30. A state ST11 shows a state in which the print unit 3 is positioned at the discharge position POS1. A state ST12 shows a state in which the print unit 3 passes through the preliminary recovery position POS2. Under passage, the recovery unit 12 performs a process of recovering discharge performance of each printhead 30 of the print unit 3. Subsequently, as shown in a state ST13, the recovery unit 12 performs the process of recovering the discharge performance of each printhead 30 in a state in which the print unit 3 is positioned at the recovery position POS3.

An absorption process of causing the absorption unit 5B to absorb a liquid component from an image formed on the transfer member 2 in the printing system having the above arrangement will be described next.

<Absorption Unit>

Figure 8:
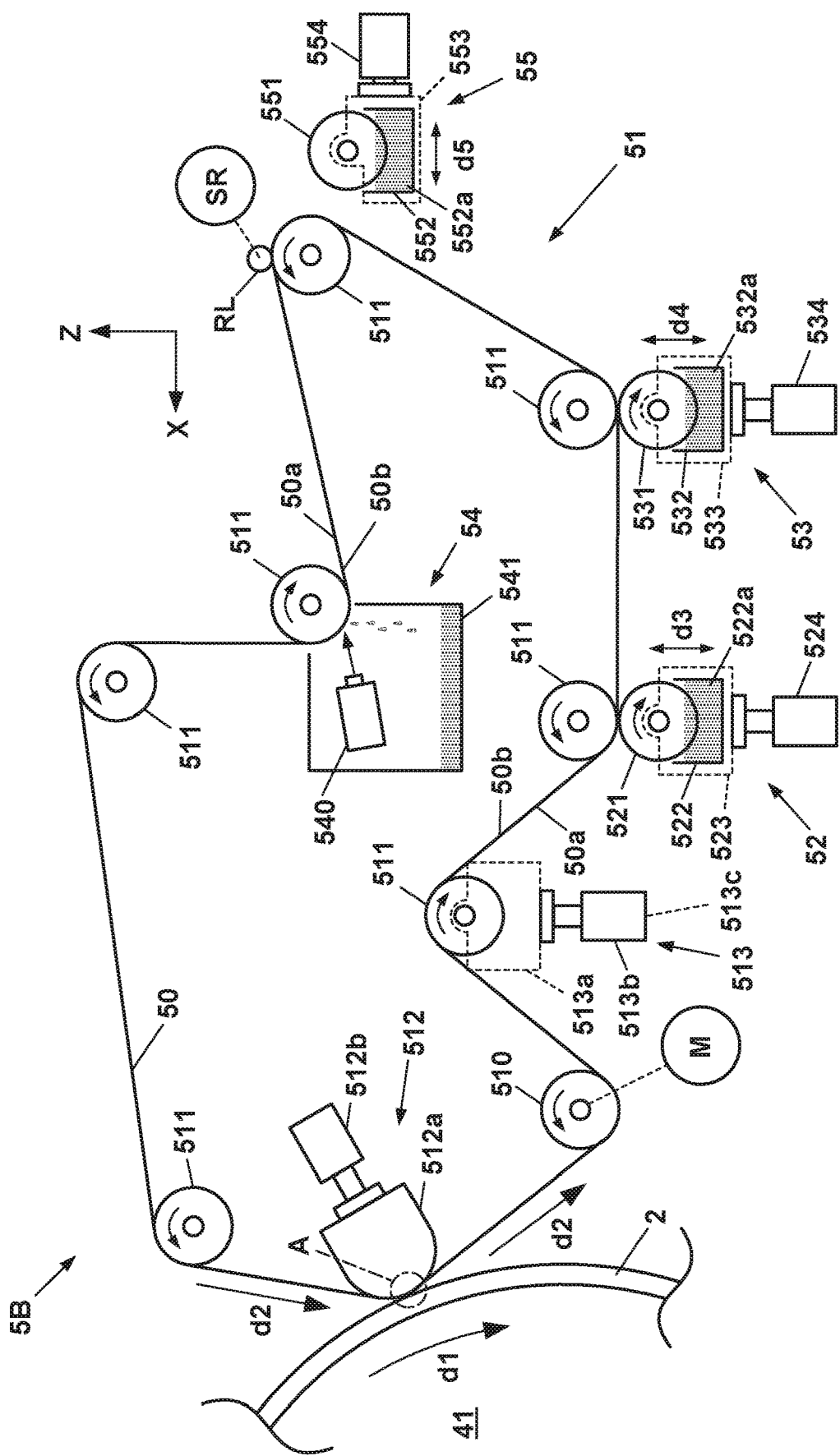
FIG. 8 is a view conceptually showing the absorption unit.
Figure 9:
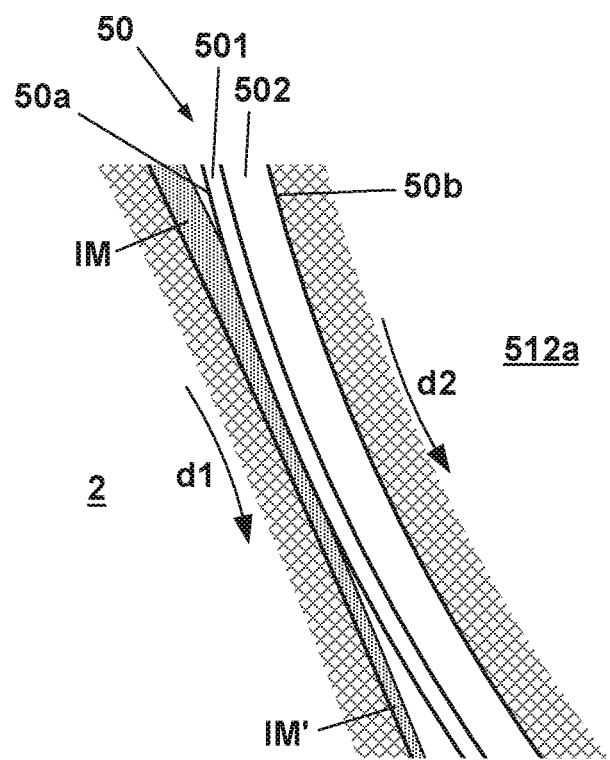
FIG. 9 is an enlarged view of portion A shown in FIG. 8.

A detailed example of the absorption unit 5B will be described with reference to FIGS. 8 and 9. FIG. 8 is a schematic view showing an example of the absorption unit 5B. FIG. 9 is an enlarged view of an A portion in FIG. 8. The absorption unit 5B is a liquid absorbing apparatus that absorbs a liquid component from the ink image IM formed on the transfer member 2 before the ink image IM is transferred to the print medium P. When the water-soluble pigment ink is used as in this embodiment, the absorption unit 5B mainly aims at absorbing moisture in the ink image. This makes it possible to suppress occurrence of a curl or cockling of the print medium P.

The absorption unit 5B includes a liquid absorbing member 50, a hold unit 51 that cyclically and movably holds the liquid absorbing member 50, a plurality of kinds of recovery units 52 to 54, and a preprocessing unit 55.

The liquid absorbing member 50 is an absorber that absorbs the liquid component from the ink image IM and is formed into an endless swath sheet (endless belt) in the example of FIG. 8. The liquid absorbing member 50 may be formed by a single layer but is formed by multiple layers in this embodiment. FIG. 9 shows a liquid absorption portion of the liquid absorbing member 50 with respect to the ink image IM and shows a portion where the liquid absorbing member 50 gets closest to the transfer member 2. An arrow d1 indicates a moving direction of the transfer member 2, and an arrow d2 indicates a moving direction of the liquid absorbing member 50.

In this embodiment, the liquid absorbing member 50 has a double layer structure of an obverse layer 501 and a reverse layer 502. However, the liquid absorbing member 50 may have a structure of three or more layers. The obverse layer 501 forms a surface 50a contacting the ink image IM, and the reverse layer 502 forms an opposite surface 50b. The liquid absorbing member 50 absorbs the liquid component of the ink image IM on the transfer member 2. The liquid component of the ink image IM penetrates from the obverse layer 501 into the liquid absorbing member 50 and further penetrates into the reverse layer 502. The ink image IM is changed to an ink image IM' with a decreased liquid component and moves toward the heating unit 5C.

Each of the obverse layer 501 and the reverse layer 502 can be made of a porous material. The average pore size of the obverse layer 501 can be made smaller than that of the reverse layer 502 in that absorption performance of the liquid component is increased while suppressing adherence of the coloring material.

A material for the obverse layer 501 may be, for example, a hydrophilic material whose contact angle with respect to water is less than 90° or a water-repellent material whose contact angle with respect to water is 90° or more. For the hydrophilic material, the material may have the contact angle with respect to water to be 40° or less. The contact angle may be measured complying with a technique described in, for example, "6. static method" of JIS R3257.

The hydrophilic material has an effect of drawing up a liquid by a capillary force. Cellulose, polyacrylamide, or a composite material of these can be given as the hydrophilic material. When the water-repellent material is used, a hydrophilic treatment may be performed on its surface. A method such as sputter etching can be given as the hydrophilic treatment.

For example, a fluorine resin can be given as the water-repellent material. For example, polytetrafluoroethylene, polychlorotrifluoroethylene, polyvinylidene fluoride, or the like can be given as the fluorine resin. A time may be taken until the effect of drawing up the liquid is exerted in a case where the water-repellent material is used for the obverse layer 501. To cope with this, a liquid whose contact angle with the obverse layer 501 is less than 90° may be impregnated into the obverse layer 501.

For example, resin-fiber nonwoven fabric or woven fabric can be given as a material for the reverse layer 502. The material for the reverse layer 502 may have the contact angle of water equal to or larger than that for the obverse layer 501 because the liquid component does not flow backward from the reverse layer 502 to the obverse layer 501. For example, polyolefin, polyurethane, polyamide such as nylon, polyester, polysulfone, or a composite material of these can be given as the material for the reverse layer.

For example, adhesive lamination, thermal lamination, or the like can be given as a laminating method of the obverse layer 501 and the reverse layer 502.

The hold unit 51 is a mechanism which holds the liquid absorbing member 50 such that it can run cyclically and includes a drive rotating body 510, a plurality of driven rotating bodies 511, and a position adjustment mechanism 512. The drive rotating body 510 and the driven rotating bodies 511 are rollers or pulleys around which the swath liquid absorbing member 50 is wound and are rotatably held about an axis in the Y direction.

The drive rotating body 510 rotates by a driving force of a motor M and runs the liquid absorbing member 50. Note that in this embodiment, the hold unit 51 is configured to include the drive rotating body 510. Omitting this, however, the hold unit 51 can also be configured to include only the driven rotating bodies 511. In this configuration, it is possible to run the liquid absorbing member 50 by pressing the liquid absorbing member 50 against the transfer member 2 and using the rotating force of the transfer member 2.

The driven rotating bodies 511 are held freely rotatably. In this embodiment, seven driven rotating bodies 511 are provided, and these driven rotating bodies 511 and the drive rotating body 510 define a moving path (running trajectory) of the liquid absorbing member 50. The moving path of the liquid absorbing member 50 is a zigzag path winding up and down when viewed from a running direction (arrow d2). This makes it possible to use the longer liquid absorbing member 50 in a smaller space and decrease a replacement frequency upon degradation in performance of the liquid absorbing member 50.

One of the plurality of driven rotating bodies 511 includes a tension adjustment mechanism 513. The tension adjustment mechanism 513 is a mechanism which adjusts the tension of the liquid absorbing member 50 and includes a hold member 513a, a moving mechanism 513b, and a sensor 513c. The hold member 513a holds the driven rotating body 511 rotatably about the axis in the Y direction. The moving mechanism 513b is a mechanism which moves the hold member 513a and is, for example, an electrically-driven cylinder. The moving mechanism 513b can displace the driven rotating body 511, adjusting the tension of the liquid absorbing member 50. The sensor 513c detects the tension of the liquid absorbing member 50. In this embodiment, the sensor 513c detects a load received by the moving mechanism 513b. The tension of the liquid absorbing member 50 can be controlled automatically by controlling the moving mechanism 513b based on a detection result of the sensor 513c.

The position adjustment mechanism 512 includes a movable member 512a and a pressing mechanism 512b. The movable member 512a is arranged facing the transfer member 2 and has a peripheral surface where the liquid absorbing member 50 slidably moves. The pressing mechanism 512b is a mechanism which moves the movable member 512a back and forth to the side of the transfer member 2, and is, for example, an electrically-driven cylinder but may be an elastic member such as a coil spring. The liquid absorbing member 50 is brought into contact with the transfer member 2 or maintained at a position an infinitesimal distance away from the surface by the position adjustment mechanism 512 and absorbs the liquid component from the ink image IM formed on the transfer member 2 before the transfer.

A sensor SR detects a running velocity of the liquid absorbing member 50. The sensor SR is, for example, a rotary encoder. In this embodiment, a rotating body RL of the sensor SR contacts the liquid absorbing member 50, rotates in accordance with running of the liquid absorbing member 50, and detects its rotation amount. The rotating body RL is arranged facing the driven rotating bodies 511. It is also possible to detect the running velocity of the liquid absorbing member 50 by detecting the rotation velocities of the driven rotating bodies 511 and the drive rotating body 510. However, the liquid absorbing member 50 may slip with respect to them. As in this embodiment, it is possible to improve detection accuracy by detecting the running velocity of the liquid absorbing member 50 directly with the sensor SR.

Based on the detection result of the sensor SR, the transfer control unit 15B controls driving of the motor M. The transfer control unit 15B drives the motor M such that, for example, the liquid absorbing member 50 runs synchronously with movement of the transfer member 2. In other words, the transfer control unit 15B controls the motor M such that a peripheral velocity on the surface of the transfer member 2 and the running velocity of the liquid absorbing member 50 match. This makes it possible to suppress scratch of the coloring material for the ink image IM by the liquid absorbing member 50. It is possible to obtain the peripheral velocity of the transfer member 2 by obtaining control information of the transfer unit 4 from the conveyance control unit 15D.

The recovery units 52 to 54 are apparatuses that recover the liquid absorption performance of the liquid absorbing member 50. By providing such recovery mechanisms, it is possible to suppress the degradation in performance of the liquid absorbing member 50 and maintain the liquid absorption performance for a longer time. This makes it possible to decrease the replacement frequency of the liquid absorbing member 50.

In this embodiment, the three kinds of recovery units 52 to 54 different in function are arranged in the middle of the moving path of the liquid absorbing member 50. However, only one recovery unit may be provided. Alternatively, a plurality of recovery units having a common function may be provided.

Out of the recovery units 52 to 54, the recovery units 52 and 53 perform processes on the surface 50a, and the recovery unit 54 performs a process on the surface 50b. By performing the different processes for the surfaces 50a and 50b, it is possible to recover the liquid absorption performance of the liquid absorbing member 50 more properly.

The recovery unit 52 is an apparatus that removes a dust particle from the liquid absorbing member 50 and includes a cleaning roller 521, a reservoir 522, a hold member 523, and a moving mechanism 524. The hold member 523 holds the cleaning roller 521 rotatably about the axis in the Y direction and also holds the reservoir 522. A cleaning liquid 522a is reserved in the reservoir 522. The cleaning roller 521 is partially immersed in the cleaning liquid 522a. The moving mechanism 524 is a mechanism which moves the hold member 523 and is, for example, an electrically-driven cylinder. The cleaning roller 521 and the reservoir 522 also move together with the hold member 523. They are moved in the direction of an arrow d3 (here, the vertical direction) between a cleaning position at which the cleaning roller 521 contacts the liquid absorbing member 50 and a retracted position at which the cleaning roller 521 is separated from the liquid absorbing member 50. FIG. 8 shows a state in which the cleaning roller 521 is located at the cleaning position. The cleaning roller 521 may always be located at the cleaning position during the operation of the printing system 1 and may be moved to the retracted position at the time of maintenance.

The cleaning roller 521 is arranged facing the driven rotating body 511. The liquid absorbing member 50 is nipped by the cleaning roller 521 and the driven rotating body 511 at the cleaning position. The cleaning roller 521 rotates in accordance with running of the liquid absorbing member 50. The peripheral surface of the cleaning roller 521 is formed by, for example, a cohesive material and removes a dust particle (paper dust or the like) adhered to the surface 50a of the liquid absorbing member 50 by contacting the surface 50a. For example, rubber of butyl, silicone, urethane, or the like can be given as a material for the peripheral surface of the cleaning roller 521. The cleaning liquid 522a is, for example, a surfactant and can use a liquid that promotes separation of a dust particle adhered to the cleaning roller 521. The reservoir 522 may include a wiper that promotes separation of a dust particle by contacting the surface of the cleaning roller 521.

In this embodiment, an arrangement that removes the dust particle adhered to the surface 50a of the liquid absorbing member 50 by the cleaning roller 521 is adopted. However, another arrangement such as an arrangement that removes the dust particle by blowing air may also be adopted.

The recovery unit 53 is an apparatus that applies a moisturizing liquid to the liquid absorbing member 50 and adopts the same mechanism as the recovery unit 52. That is, the recovery unit 53 includes an application roller 531, a reservoir 532, a hold member 533, and a moving mechanism 534. The hold member 533 holds the application roller 531 rotatably about the axis in the Y direction and also holds the reservoir 532. A moisturizing liquid 532a is reserved in the reservoir 532. The application roller 531 is partially immersed in the moisturizing liquid 532a. The moving mechanism 534 is a mechanism which moves the hold member 533 and is, for example, an electrically-driven cylinder. The application roller 531 and the reservoir 532 also move together with the hold member 533. They are moved in the direction of an arrow d4 (here, the vertical direction) between an application position at which the application roller 531 contacts the liquid absorbing member 50 and a retracted position at which the application roller 531 is separated from the liquid absorbing member 50. FIG. 8 shows a state in which the application roller 531 is located at the application position. The application roller 531 may always be located at the application position during the operation of the printing system 1 and may be moved to the retracted position at the time of maintenance.

The application roller 531 is arranged facing the driven rotating body 511. The liquid absorbing member 50 is nipped by the application roller 531 and the driven rotating body 511 at the application position. The application roller 531 rotates in accordance with running of the liquid absorbing member 50. The peripheral surface of the application roller 531 is formed by, for example, rubber and supplies the moisturizing liquid 532a reserved in the reservoir 532 to the surface 50a of the liquid absorbing member 50 by drawing it. The moisturizing liquid 532a is, for example, water. The moisturizing liquid 532a may contain a water-soluble organic solvent or a surfactant.

The surface 50a may be thickened by using the liquid absorbing member 50, and this may degrade absorption performance of the liquid component from the ink image IM. It is possible to suppress thickening of the surface 50a and maintain the absorption performance of the liquid component by applying the moisturizing liquid 532a to the surface 50a.

Note that vertical movement control of the application roller 531 and the reservoir 532 for maintaining the absorption performance of the liquid absorbing member 50 will be described later.

In this embodiment, an arrangement that draws the moisturizing liquid 532a to the surface 50a of the liquid absorbing member 50 by the application roller 531 is adopted. However, another arrangement such as an arrangement that sprays the moisturizing liquid 532a to the surface 50a by a nozzle may also be adopted.

The recovery unit 54 is an apparatus that removes the liquid component absorbed by the liquid absorbing member 50 from the liquid absorbing member 50 and includes, in this embodiment, a nozzle 540 that ejects air and a reservoir 541 that stores the removed liquid component. The nozzle 540 blows the air to the surface 50b of the liquid absorbing member 50 and with that pressure, removes the liquid component absorbed into the reverse layer 502 to be blown off. By removing the liquid component from the reverse layer 502, it is possible to recover the liquid absorption capacity of the liquid absorbing member 50 while suppressing drying of the moisture surface 50a by the recovery unit 53.

In this embodiment, the nozzle 540 has an air ejection direction toward the driven rotating body 511 and ejects the air to the liquid absorbing member 50 backed up by the driven rotating body 511. It is therefore possible to suppress deformation in the liquid absorbing member 50 even if an air pressure is increased. Moreover, the air ejection direction of the nozzle 540 is directed to a direction crossing the thickness direction of the liquid absorbing member 50. It is therefore possible to remove the liquid component while suppressing its backward flow from the reverse layer 502 to the obverse layer 501. The reservoir 541 is arranged so as to surround an air ejection position of the driven rotating body 511 and can capture the removed liquid component more reliably.

Air ejection from the nozzle 540 may always be performed during the operation of the printing system 1, or may intermittently or periodically be performed in accordance with an absorption status of the liquid component of the liquid absorbing member 50. In this embodiment, an arrangement that removes the liquid component from the liquid absorbing member 50 by ejecting the air is adopted.

However, another embodiment can also be adopted. For example, an arrangement that removes the liquid component by bringing a roller having a liquid absorber on its peripheral surface into contact with the liquid absorbing member 50, an arrangement that squeezes the liquid component by pressing a squeezing roller against the liquid absorbing member 50, or the like can be adopted.

As described above, in this embodiment, an arrangement is adopted in which the recovery units 52 to 54 perform recovery processing in the processing order of the removal of the dust particle, moisturizing, and the removal of the liquid component from an upstream side to a downstream side in the running direction of the liquid absorbing member 50. The processing order is not limited to this. According to the processing order of this embodiment, however, the recovery unit 53 moisturizes the surface 50a after the recovery unit 52 cleans the surface 50a, making it possible to promote the removal of the dust particle and an improvement in moisture retention. Moreover, the recovery unit 54 removes the liquid component relatively on the downstream side, making it possible to remove the liquid component in a place where the surface 50b runs at a high position in the vertical direction. This has the advantage that air is easily blown to the surface 50b and in addition, the removed liquid component is easily collected by using gravity.

The preprocessing unit 55 will be described next. The preprocessing unit 55 is an apparatus that mainly performs preprocessing for making full use of the liquid absorption performance of the liquid absorbing member 50 in a short time at the start of the operation of the printing system 1 or the like. In this embodiment, a preprocessing liquid is applied to the surface 50a of the liquid absorbing member 50, improving a rise in liquid absorption performance. For example, in a case where the obverse layer 501 is made of the water-repellent material, the preprocessing liquid can use a surfactant. F-444 (trade name, available from DIC), ZonylFS3100 (trade name, available from DuPont), or CapstoneFS-3100 (trade name, available from The Chemours CompanyLCC) of a fluorochemical surfactant is given as the surfactant. BYK349 (trade name, available from BYK) of a silicone-based surfactant or the like is also given.

The preprocessing unit 55 adopts the same mechanism as the recovery unit 52 and the recovery unit 53. That is, the preprocessing unit 55 includes an application roller 551, a reservoir 552, a hold member 553, and a moving mechanism 554. The hold member 553 holds the application roller 551 rotatably about the axis in the Y direction and also holds the reservoir 552. A preprocessing liquid 552a is reserved in the reservoir 552. The application roller 551 is partially immersed in the preprocessing liquid 552a. The moving mechanism 554 is a mechanism which moves the hold member 553 and is, for example, an electrically-driven cylinder. The application roller 551 and the reservoir 552 also move together with the hold member 553. They are moved in the direction of an arrow d5 (here, the horizontal direction) between an application position at which the application roller 551 contacts the liquid absorbing member 50 and a retracted position at which the application roller 551 is separated from the liquid absorbing member 50. FIG. 8 shows a state in which the application roller 551 is located at the retracted position. The application roller 551 can move to the application position at the start of the operation of the printing system 1 or periodically (for example, in the unit of the number of print media P to be processed).

The application roller 551 is arranged facing the driven rotating body 511. The liquid absorbing member 50 is nipped by the application roller 551 and the driven rotating body 511 at the application position. The application roller 551 rotates in accordance with running of the liquid absorbing member 50. The peripheral surface of the application roller 551 is formed by, for example, rubber and supplies the preprocessing liquid 552a reserved in the reservoir 552 to the surface 50a of the liquid absorbing member 50 by drawing it.

With the above arrangement, the absorption unit 5B removes the liquid component from the ink image IM on the transfer member 2 by the liquid absorbing member 50. The liquid component can be removed from the ink image IM continuously by removing the liquid component simultaneously with cyclical movement of the liquid absorbing member 50, making it possible to remove the liquid component without replacing the liquid absorbing member 50 during a predetermined operation period. In addition, the liquid absorption performance of the liquid absorbing member 50 can be maintained for a longer period of time by providing the recovery units 52 to 54, making it possible to prolong a replacement cycle of the liquid absorbing member 50.

<Another Arrangement Example of Absorption Unit>

Figure 10:
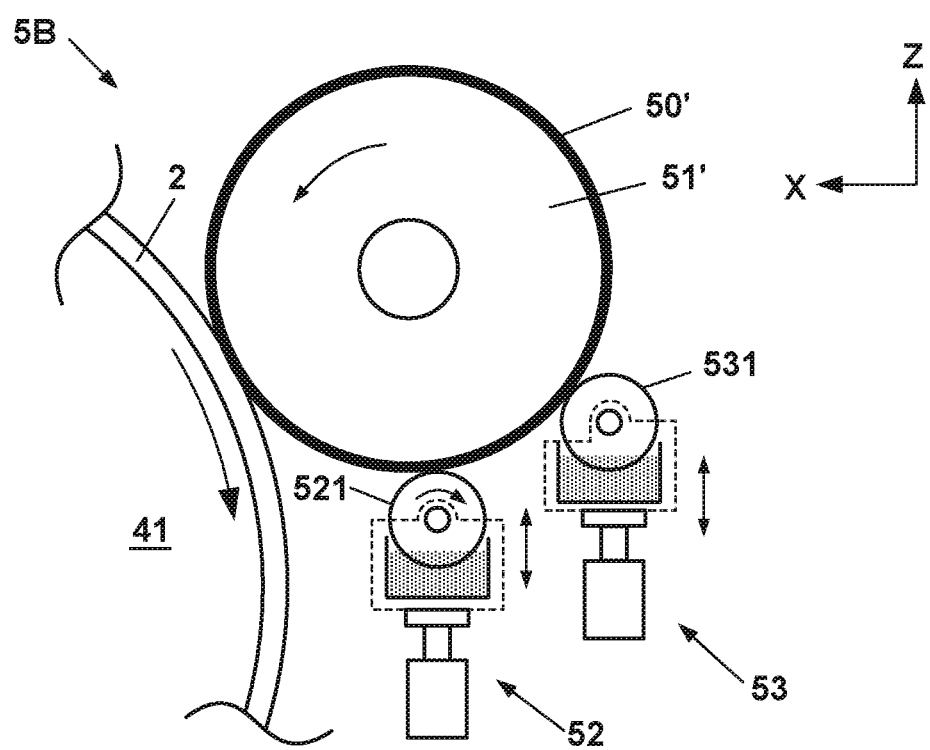
FIG. 10 is a view conceptually showing another example of the absorption unit.

In the above-described embodiment, the liquid absorbing member 50 is formed into an endless swath and configured to run cyclically. However, another arrangement can also be adopted. FIG. 10 shows an example of this. In the example of FIG. 10, a hold unit 51' includes a rotating body such as a roller that can rotate about the axis in the Y direction, and a liquid absorbing member 50' is disposed on its peripheral surface. The liquid absorbing member 50' moves cyclically by rotating the hold unit 51'. The recovery units 52 and 53 are exemplarily arranged in the middle of a moving path of the liquid absorbing member 50'. It is also possible to provide a mechanism corresponding to the recovery unit 54 and a mechanism corresponding to the preprocessing unit 55 described above.

The hold unit 51' may rotate in accordance with the transfer drum 41 or may include a driving mechanism which rotates the hold unit 51' independently.

<Operation of Recovery Unit>

FIGS. 11A to 11D are, respectively, a perspective view showing the overall arrangement of the recovery unit 53, and views each showing a positional relationship among the driven rotating body 511, the application roller 531, and the reservoir 532.

Figure 11A:
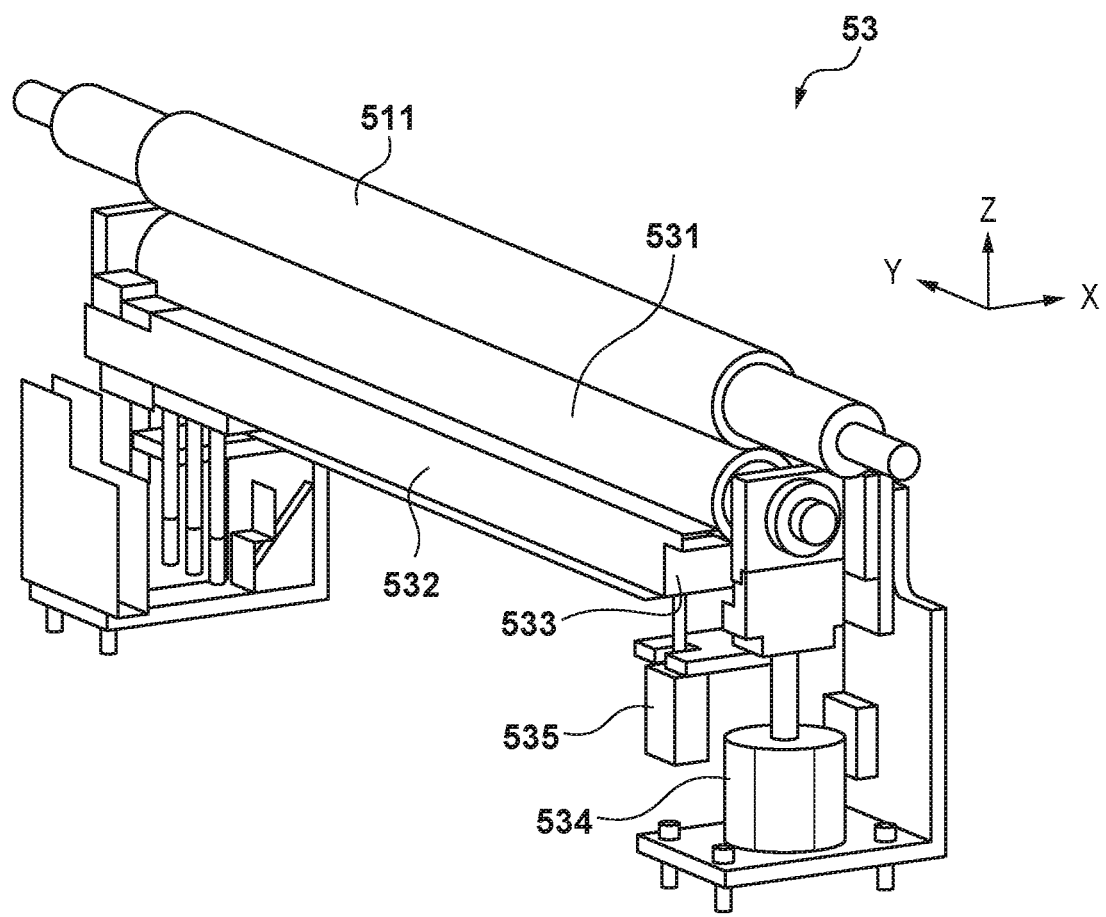

As shown in FIG. 11A, it is possible to nip and convey the liquid absorbing member 50 by forming a nip portion with the driven rotating body 511 and the application roller 531. The application roller 531 is moved vertically in a Z-axis direction by the moving mechanism 534, and the reservoir 532 reserving the moisturizing liquid 532a is also moved vertically in the Z-axis direction by a moving mechanism 535. Note that the moving mechanism 534 and the moving mechanism 535 can be operated independently of each other, and the application roller 531 and the reservoir 532 can be moved vertically individually.

FIG. 11B shows a state in which the application roller 531 and the reservoir 532 are raised by the moving mechanisms 534 and 535, and the liquid absorbing member 50 is nipped by the driven rotating body 511 and the application roller 531 while the application roller 531 is immersed in the moisturizing liquid 532a of the reservoir 532. In this state, a sufficient amount of the moisturizing liquid 532a can be applied to the liquid absorbing member 50.

FIG. 11C shows a state in which the liquid absorbing member 50 is nipped by the driven rotating body 511 and the application roller 531 while the reservoir 532 is lowered by the moving mechanism 535, and only the application roller 531 is raised with being spaced apart from the reservoir 532. In this state, the moisturizing liquid 532a impregnated in the application roller 531 is applied to the liquid absorbing member 50 even at maximum.

FIG. 11D shows a state in which the application roller 531 is lowered by the moving mechanism 534 in the Z-axis direction, the reservoir 532 is lowered by the moving mechanism 535 in the Z-axis direction, and the application roller 531 is separated from the liquid absorbing member 50. In this state, the nip portion is not formed by the driven rotating body 511 and the application roller 531, and the liquid absorbing member 50 is conveyed by another roller. Furthermore, in this state, the moisturizing liquid 532a is not applied to the liquid absorbing member 50.

It is therefore possible to adjust the amount of the moisturizing liquid 532a applied to the liquid absorbing member 50 by driving the moving mechanism 534 and the moving mechanism 535 to control vertical movements of the application roller 531 and reservoir 532.

As is apparent from the above-description, the absorption performance of the liquid absorbing member 50 is influenced by the dry condition of the surface 50a. Then, the dry condition (in other words, the moist condition) is influenced by the amount of a liquid component of ink absorbed by the liquid absorbing member 50. For example, the amount of the liquid component of the absorbed ink also increases when an ink discharge amount from each printhead 30 needed to form an image on the transfer member 2 is large, and the amount of the liquid component of the absorbed ink also decreases when the ink discharge amount from each printhead 30 is small. This ink discharge amount depends on print data used for image formation.

Therefore, in this embodiment, the dry condition (moist condition) of the surface 50a is determined by measuring the surface of the liquid absorbing member 50 with a sensor and estimating the water amount, and further by estimating an ink discharge amount based on the print data. Then, the vertical movements of the application roller 531 and reservoir 532 are controlled in accordance with that determination result, adjusting the amount of the moisturizing liquid applied to the liquid absorbing member 50.

Figure 12A:
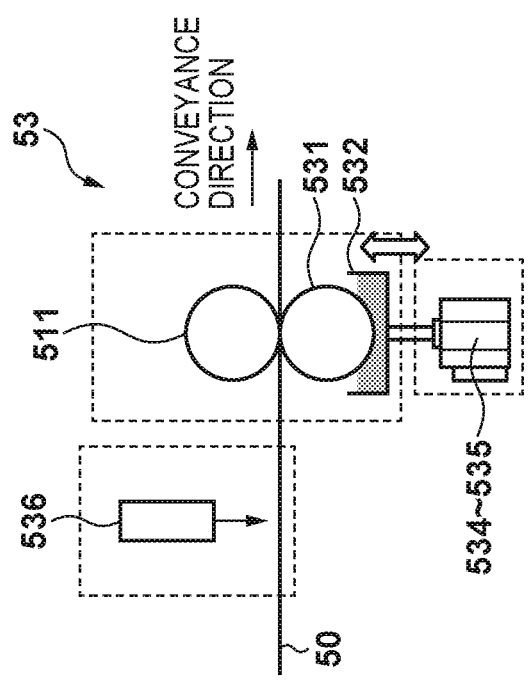
FIGS. 12A and 12B are explanatory views showing a temporal variation of water amount which a liquid absorbing member holds, and control of a water amount variation.
Figure 12B:
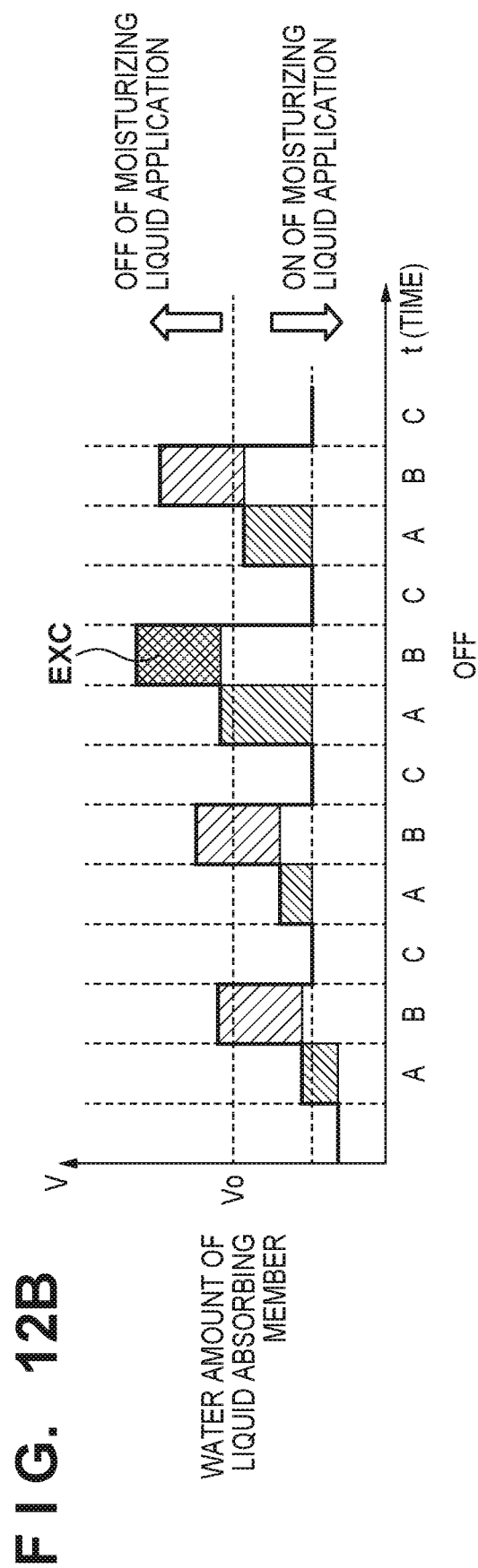

FIGS. 12A and 12B are a view and a timing chart for explaining control of a time-rate change in water amount kept by the liquid absorbing member 50 and a change in water amount.

As shown in FIG. 12A, a sensor 536 that measures the water amount of the liquid absorbing member 50 is provided on the upstream side of the recovery unit 53 concerning a conveyance direction of the liquid absorbing member 50. The sensor 536 is an infrared sensor that measures infrared rays in wavelength bands absorbed by moisture, and the output of the infrared sensor is changed by the water amount of the liquid absorbing member 50. In this embodiment, the operations of the moving mechanisms 534 and 535 are controlled based on the output from the infrared sensor.

As described above, the liquid absorbing member 50 runs by rotating the drive rotating body 510 and the driven rotating bodies 511, contacts the transfer member 2, and absorbs the liquid component from the ink image formed on the transfer member 2. The recovery units 52 to 54 perform recovery processing for the removal of a dust particle from the liquid absorbing member 50, application of the moisturizing liquid, and the removal of the liquid component, and the water amount of the liquid absorbing member 50 is changed by applying the preprocessing liquid with the preprocessing unit 55. The liquid absorbing member 50 runs cyclically, and thus the water amount of the liquid absorbing member 50 also changes periodically.

FIG. 12B shows a state in which the water amount kept by the liquid absorbing member 50 changes periodically. This change indicates a change in water amount in a predetermined portion of the liquid absorbing member 50. One period of the change in water amount is divided into three sections A, B, and C. In the section A, the liquid component is absorbed from the ink image formed on the transfer member 2 by contacting the transfer member 2. Accordingly, the water amount of the liquid absorbing member 50 increases. In the next section B, the water amount of the liquid absorbing member 50 is further increased by applying the moisturizing liquid with the recovery unit 53. In the further next section C, the water amount of the liquid absorbing member 50 is further decreased by removing the liquid component with the recovery unit 54. Furthermore, the predetermined portion contacts the transfer member 2 by running the liquid absorbing member 50, and thus the water amount is increased by that contact in the next section A. Thus focusing on the predetermined portion of the liquid absorbing member 50, the water amount in the predetermined portion changes as the section A→the section B→the section C . . . in accordance with running of the liquid absorbing member 50.

Note that in FIG. 12B, $V_0$ denotes a water amount (moist condition) adequate for the liquid absorbing member 50 to keep a sufficient absorption capability and absorb the liquid component of the ink image. In FIG. 12B, EXC indicates that the liquid absorbing member 50 greatly exceeds the adequate water amount $V_0$ by applying the moisturizing liquid and is brought into an excessive moist condition. Therefore, in this embodiment, the moving mechanisms 534 and 535 are driven to lower the application roller 531 and the reservoir 532, stopping application of the moisturizing liquid (OFF of FIG. 12B).

Thus, in this embodiment, concerning a water amount V of the liquid absorbing member 50, $V_0$ is used as a threshold, the water amount V is compared with the threshold $V_0$, and in accordance with that comparison result, ON/OFF of the application of the moisturizing liquid is controlled.

Figure 13B:
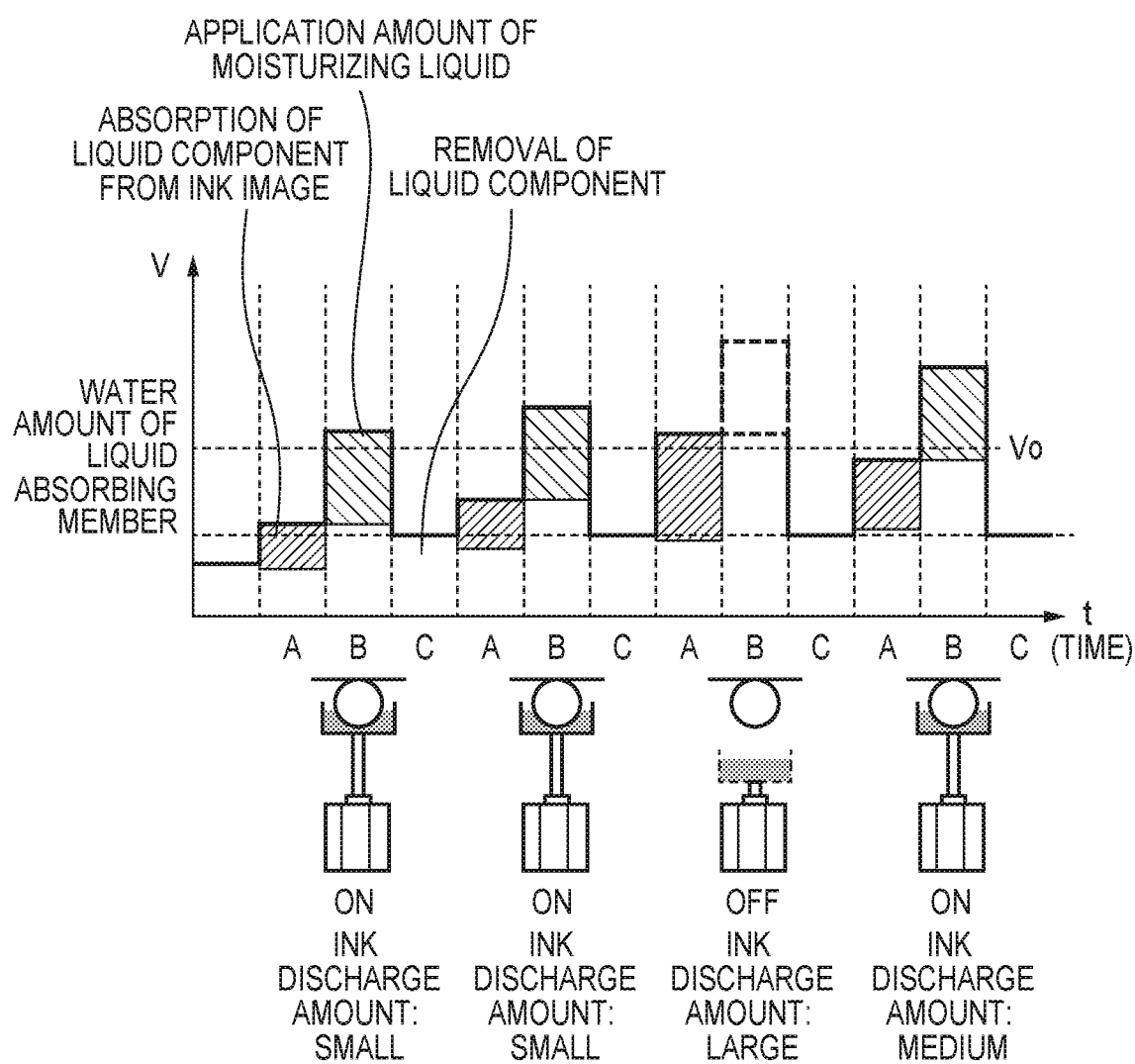

FIGS. 13A and 13B are a view and a timing chart showing a relationship between an ink discharge amount from the printhead and ON/OFF of the application of the moisturizing liquid.

FIG. 13A shows a state in which the ink discharge amount discharged from the printhead 30 to the transfer member 2 changes. For example, if an image is formed for each quadrant on the rotating columnar transfer member 2, the ink discharge amount needed to form each image changes in accordance with its print data. Accordingly, an absorption amount of the liquid absorbing member 50 that contacts the transfer member 2 in synchronism with the rotation of the transfer member 2 and absorbs the liquid component from each formed image also changes.

FIG. 13B shows a time-rate change in water amount of the liquid absorbing member 50 that absorbs the liquid component from each formed image in accordance with image formation as shown in FIG. 13A and ON/OFF control of the application of the moisturizing liquid. Note that the sections A, B, and C shown in FIG. 13B are as described with reference to FIGS. 12A and 12B. The degrees of the ink discharge amount shown in FIG. 13B correspond to those shown in FIG. 13A.

According to FIG. 13B, when the ink discharge amount used for image formation is "small", the water amount absorbed by the liquid absorbing member 50 in section A is also small. The water amount V of the liquid absorbing member 50 obtained by increasing this absorbed water amount is smaller than the threshold $V_0$, driving the moving mechanisms 534 and 535 to raise the application roller 531 and the reservoir 532, and applying the moisturizing liquid in section B.

When the ink discharge amount used for image formation is "medium", the water amount absorbed by the liquid absorbing member 50 in section A increases slightly. However, the water amount V of the liquid absorbing member 50 obtained by increasing this absorbed water amount is still smaller than the threshold $V_0$, driving the moving mechanisms 534 and 535 to raise the application roller 531 and the reservoir 532, and applying the moisturizing liquid in section B. In contrast, when the ink discharge amount used for image formation is "large", the water amount absorbed by the liquid absorbing member 50 in section A is also large, and the water amount V of the liquid absorbing member 50 obtained by increasing this absorbed water amount exceeds the threshold $V_0$. Accordingly, in this case, the moving mechanisms 534 and 535 are driven to lower the application roller 531 and the reservoir 532, and the application of the moisturizing liquid is stopped in section B. Note that the ink discharge amount can be estimated by analyzing print data used to drive the printhead 30.

With the above control, the condition of the liquid absorbing member 50 is kept at an appropriate moist condition.

Note that as described above, the water amount of the liquid absorbing member 50 may directly be measured by the infrared sensor, and ON/OFF of the application of the moisturizing liquid may be controlled in consideration of that measurement result. Furthermore, ON/OFF of the application of the moisturizing liquid may be controlled by using both the ink discharge amount used for image formation and the measurement result of the infrared sensor. This makes it possible to perform the control more accurately.

Figure 14:
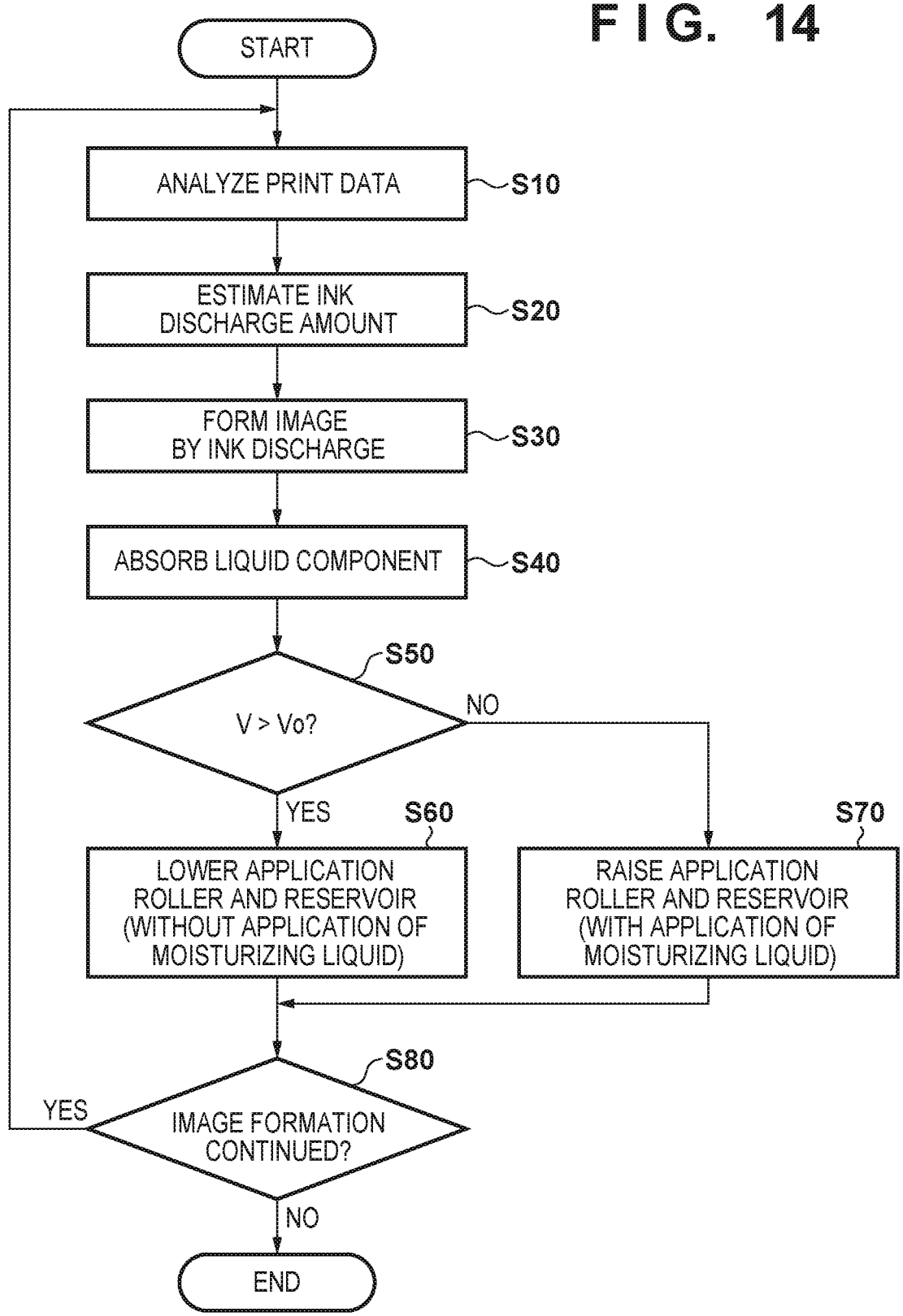
FIG. 14 is a flowchart showing moisturizing liquid application control processing.

FIG. 14 is a flowchart showing a process for control of the application of the moisturizing liquid performed in this embodiment.

First, print data used for image formation is analyzed in step S10 and based on that analysis result, an ink discharge amount from each printhead 30 is estimated in step S20. The volume of one ink droplet discharged from the printhead 30 is defined from the specifications of the printhead, and thus the ink discharge amount is estimated if a discharge count occurred in one image forming operation is obtained based on the print data.

Then, in step S30, an image is formed on the transfer member 2 by discharging ink from the printhead 30 based on the print data. When the transfer member 2 rotates and reaches a contact point with the liquid absorbing member 50, the liquid absorbing member 50 absorbs a liquid component from the image formed on the transfer member 2 in step S40.

In step S50, it is checked whether the water amount V of the liquid absorbing member exceeds the threshold $V_0$ by an increase in water amount caused by absorbing the liquid component. Note that the water amount V is estimated from the ink discharge amount estimated in step S20. As described above, however, the water amount which is directly measured by the infrared sensor provided on the upstream side of the recovery unit 53 may be used.

In either case, if $V>V_0$ holds, and the water amount of the liquid absorbing member 50 exceeds the threshold, the process advances to step S60 in which the moving mechanisms 534 and 535 are operated to lower the application roller 531 and the reservoir 532. Consequently, the moisturizing liquid is not applied to the liquid absorbing member 50. In contrast, if $V \leq V_0$ holds, and the water amount of the liquid absorbing member 50 becomes equal to or smaller than the threshold, the process advances to step S70 in which the moving mechanisms 534 and 535 are operated to raise the application roller 531 and the reservoir 532. Consequently, the moisturizing liquid is applied to the liquid absorbing member 50.

Finally, in step S80, the process checks whether to continue an image forming operation. If it is determined here to continue the operation, the process returns to step S10 to repeat the above-described process. In contrast, if it is determined to terminate the operation, the process ends.

Therefore, according to the above-described embodiment, it is possible to estimate the water amount of the liquid absorbing member and control the application of the moisturizing liquid based on the estimated water amount. Consequently, when the surface of the liquid absorbing member is in a sufficient moist condition, the moisturizing liquid is prevented from being applied excessively by suppressing the application of the moisturizing liquid. It is also possible to suppress the utilization of the moisturizing liquid.

Note that in the above-described embodiment, adjustment of the application amount of the moisturizing liquid by moving up and down vertically the application roller 531 and the reservoir 532 has been described. However, the present invention is not limited to this. For example, as shown in FIG. 11C, it is also possible to adjust the application amount of the moisturizing liquid by setting a state in which the reservoir 532 is lowered while the application roller 531 is raised. Furthermore, this adjustment can be controlled more finely by changing, for example, a time in which the state of FIG. 11B is maintained, a time in which the state of FIG. 11C is maintained, and a time in which the state of FIG. 11D is maintained. Moreover, a time elapsed from the printing stop of this printing system may be measured by a timer and if the elapsed time exceeds a predetermined time, the moisturizing liquid may be applied by determining that the liquid absorbing member is brought into a dry condition.

Another Embodiment

In the above embodiment, the print unit 3 includes the plurality of printheads 30. However, a print unit 3 may include one printhead 30. The printhead 30 may not be a full-line head, but may be of a serial type that forms an ink image while scanning a carriage to which the printhead 30 is detachably mounted in a Y direction, and discharging ink from the printhead 30.

A conveyance mechanism of the print medium P may adopt another method such as a method of clipping and conveying the print medium P by the pair of rollers. In the method of conveying the print medium P by the pair of rollers or the like, a roll sheet may be used as the print medium P, and a printed product P' may be formed by cutting the roll sheet after transfer.

In the above embodiment, the transfer member 2 is provided on the outer peripheral surface of the transfer drum 41. However, another method such as a method of forming a transfer member 2 into an endless swath and running it cyclically may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-061885, filed Mar. 27, 2017, which is hereby incorporated by reference herein in its entirety.

What is claimed is:

1. A printing apparatus comprising:
an image forming unit configured to form an ink image by discharging ink from a printhead to a transfer member;
a transfer unit configured to perform a transfer operation of transferring the ink image formed on the transfer member to a print medium;
a liquid absorbing member configured to be cyclically movable and to absorb a liquid component from the ink image before the transfer operation;
a recovery unit arranged on a moving path of the liquid absorbing member and configured to recover absorption performance of the liquid absorbing member by applying a moisturizing liquid to the liquid absorbing member;
a first estimation unit configured to estimate, based on print data, an ink discharge amount of ink to be discharged from the printhead in order to form the ink image;
a second estimation unit configured to estimate a liquid amount of the liquid component to be absorbed by the liquid absorbing member from the ink discharge amount estimated by the first estimation unit; and
a control unit configured to control an application amount of the moisturizing liquid by the recovery unit based on a result of estimation by the second estimation unit.

2. The printing apparatus according to claim 1, wherein the liquid absorbing member is an endless sheet, and
wherein the printing apparatus further comprises a holding unit configured to hold the sheet to be cyclically movable.

3. The printing apparatus according to claim 1, further comprising a sensor configured to measure a liquid amount of the liquid component absorbed by the liquid absorbing member, wherein the sensor is provided on an upstream side of the recovery unit with respect to a direction in which the liquid absorbing member moves cyclically.

4. The printing apparatus according to claim 1, wherein the control unit compares the liquid amount of the liquid absorbing member estimated by the second estimation unit with a predetermined threshold, and, based on a result of the comparison, controls the application amount of the moisturizing liquid by the recovery unit.

5. The printing apparatus according to claim 4, wherein the recovery unit includes:
a reservoir configured to store the moisturizing liquid;
a roller immersed in the moisturizing liquid of the reservoir and configured to supply the moisturizing liquid; and
a first moving mechanism configured to bring the roller into contact with the liquid absorbing member in order to apply the moisturizing liquid to the liquid absorbing member, and configured to separate the roller from the liquid absorbing member.

6. The printing apparatus according to claim 5, wherein the recovery unit further includes a second moving mechanism, operable separately from the first moving mechanism, and configured to move the reservoir relative to the roller in order to set one of (i) a state in which the roller is immersed in the moisturizing liquid of the reservoir, and (ii) a state in which the roller is separated from the reservoir.

7. The printing apparatus according to claim 6, wherein the control unit operates the first moving mechanism and the second moving mechanism so as not to apply the moisturizing liquid by one of (i) an operation of separating the roller from the liquid absorbing member, and (ii) an operation of separating the roller from the reservoir while bringing the roller into contact with the liquid absorbing member, if the liquid amount of the liquid absorbing member is greater than the predetermined threshold, and operates the first moving mechanism and the second moving mechanism so as to apply the moisturizing liquid by bringing the roller into contact with the liquid absorbing member, if the liquid amount of the liquid absorbing member is not greater than the predetermined threshold.

8. The printing apparatus according to claim 1, wherein the ink image is formed by water-based ink, and the liquid absorbing member absorbs at least moisture from the ink image.

9. The printing apparatus according to claim 1, wherein the moisturizing liquid is applied after the liquid absorbing member absorbs the liquid component.

10. A liquid absorbing apparatus comprising:
a liquid absorbing member configured to be cyclically movable and to absorb a liquid component from an ink image, formed by discharging ink from a printhead to a transfer member, before the ink image is transferred to a print medium;
a recovery unit arranged on a moving path of the liquid absorbing member and configured to recover absorption performance of the liquid absorbing member by applying a moisturizing liquid to the liquid absorbing member;
a first estimation unit configured to estimate, based on print data, an ink discharge amount of ink to be discharged from the printhead in order to form the ink image;
a second estimation unit configured to estimate a liquid amount of the liquid component to be absorbed by the liquid absorbing member from the ink discharge amount estimated by the first estimation unit; and
a control unit configured to control an application amount of the moisturizing liquid by the recovery unit based on a result of estimation by the second estimation unit.

11. The liquid absorbing apparatus according to claim 10, wherein the liquid absorbing member is an endless sheet, and
wherein the printing apparatus further comprises a holding unit configured to hold the sheet to be cyclically movable.

12. The liquid absorbing apparatus according to claim 10, further comprising a sensor configured to measure a liquid amount of the liquid absorbing member, wherein the sensor is provided on an upstream side of the recovery unit with respect to a direction in which the liquid absorbing member moves cyclically.

13. The liquid absorbing apparatus according to claim 10, wherein the control unit compares the liquid amount of the liquid absorbing member estimated by the second estimation unit with a predetermined threshold, and based on a result of the comparison, controls the application amount of the moisturizing liquid by the recovery unit.

14. The liquid absorbing apparatus according to claim 13, wherein the recovery unit includes:
a reservoir configured to store the moisturizing liquid;
a roller immersed in the moisturizing liquid of the reservoir and configured to supply the moisturizing liquid; and
a first moving mechanism configured to bring the roller into contact with the liquid absorbing member in order to apply the moisturizing liquid to the liquid absorbing member, and configured to separate the roller from the liquid absorbing member.

15. The liquid absorbing apparatus according to claim 14, wherein the recovery unit further includes a second moving mechanism, operable separately from the first moving mechanism, and configured to move the reservoir relative to the roller in order to set one of (i) a state in which the roller is immersed in the moisturizing liquid of the reservoir, and (ii) a state in which the roller is separated from the reservoir.

16. The liquid absorbing apparatus apparatus according to claim 15, wherein the control unit operates the first moving mechanism and the second moving mechanism so as not to apply the moisturizing liquid by one of (i) an operation of separating the roller from the liquid absorbing member, and (ii) an operation of separating the roller from the reservoir while bringing the roller into contact with the liquid absorbing member, if the liquid amount of the liquid absorbing member is greater than the predetermined threshold, and operates the first moving mechanism and the second moving mechanism so as to apply the moisturizing liquid by bringing the roller into contact with the liquid absorbing member, if the liquid amount of the liquid absorbing member is not greater than the predetermined threshold.

17. The liquid absorbing apparatus according to claim 10, wherein the ink image is formed by water-based ink, the liquid absorbing member absorbs at least moisture from the ink image, and the moisturizing liquid is applied after the liquid absorbing member absorbs the liquid component.

18. A printing method of a printing apparatus that forms an ink image by discharging ink from a printhead to a transfer member, transfers the formed ink image to a print medium, and prints the image, the method comprising:
   forming the ink image by discharging the ink from the printhead to the transfer member;
   absorbing a liquid component from the ink image formed on the transfer member by cyclically moving a liquid absorbing member;
   estimating, based on print data, an ink discharge amount of ink to be discharged from the printhead in order to form the ink image;
   estimating a liquid amount of the liquid component to be absorbed by the liquid absorbing member from the estimated ink discharge amount;
   recovering absorption performance of the liquid absorbing member by applying a moisturizing liquid to the liquid absorbing member with a recovery unit arranged on a moving path of the liquid absorbing member;
   controlling an application amount of the moisturizing liquid by the recovery unit based on the estimated liquid amount; and
   transferring the ink image, from which the liquid component is absorbed, to the print medium.

* * * * *